United States Patent
Araki

(10) Patent No.: US 11,985,232 B2
(45) Date of Patent: May 14, 2024

(54) SECURE COMPUTING SERVER, SYSTEM, SECURE COMPUTING METHOD, AND PROGRAM

(71) Applicant: NEC Corporation, Tokyo (JP)

(72) Inventor: Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 491 days.

(21) Appl. No.: 17/287,601

(22) PCT Filed: Oct. 26, 2018

(86) PCT No.: PCT/JP2018/039818
§ 371 (c)(1),
(2) Date: Apr. 22, 2021

(87) PCT Pub. No.: WO2020/084751
PCT Pub. Date: Apr. 30, 2020

(65) Prior Publication Data
US 2021/0399878 A1 Dec. 23, 2021

(51) Int. Cl.
*H04L 9/08* (2006.01)
*G06F 5/01* (2006.01)
*H04L 9/32* (2006.01)

(52) U.S. Cl.
CPC .......... *H04L 9/085* (2013.01); *G06F 5/01* (2013.01); *H04L 9/0894* (2013.01); *H04L 9/3231* (2013.01)

(58) Field of Classification Search
None
See application file for complete search history.

(56) References Cited

U.S. PATENT DOCUMENTS

| | | | |
|---|---|---|---|
| 7,986,780 B2* | 7/2011 | Kerschbaum | H04L 9/008 380/42 |
| 9,071,598 B2* | 6/2015 | Ramzan | H04L 9/0844 |
| 11,250,142 B1* | 2/2022 | Wu | H04L 9/0819 |
| 11,290,265 B2* | 3/2022 | Tsuchida | H04L 9/0869 |
| 11,689,371 B2* | 6/2023 | Yadlin | H04L 9/30 713/168 |
| 2014/0372769 A1* | 12/2014 | Kerschbaum | H04L 9/008 713/189 |
| 2015/0244525 A1* | 8/2015 | McCusker | H04L 9/3218 380/44 |
| 2016/0330018 A1* | 11/2016 | Miyata | H04L 9/3226 |

(Continued)

FOREIGN PATENT DOCUMENTS

| | | |
|---|---|---|
| JP | H07-146777 A | 6/1995 |
| JP | 2008-134757 A | 6/2008 |

(Continued)

OTHER PUBLICATIONS

Cramer et al.; A Secure and Optimally Efficient Multi-Authority Election Scheme; IBM (Year: 1997).*

(Continued)

*Primary Examiner* — Kambiz Zand
*Assistant Examiner* — Mahabub S Ahmed

(57) ABSTRACT

There is provided a secure computing server that performs shift operation on secretly distributed shares. The secure computing server may perform the shift operation when a number of significant digits of secret information corresponding to a secretly distributed share is to be reduced.

11 Claims, 23 Drawing Sheets

(56) References Cited

U.S. PATENT DOCUMENTS

| | | | |
|---|---|---|---|
| 2017/0109852 A1 | 4/2017 | Ito | |
| 2017/0149796 A1* | 5/2017 | Gvili | H04L 63/0428 |
| 2017/0161480 A1 | 6/2017 | Jo | |
| 2017/0272251 A1* | 9/2017 | Osheter | H04L 63/062 |
| 2017/0318008 A1* | 11/2017 | Mead | H04L 63/083 |
| 2018/0139045 A1 | 5/2018 | Furukawa et al. | |
| 2018/0276417 A1* | 9/2018 | Cerezo Sanchez | H04L 9/008 |
| 2020/0057755 A1* | 2/2020 | Veeningen | G06F 21/79 |
| 2020/0082113 A1* | 3/2020 | Van Liesdonk | G06Q 10/087 |
| 2020/0084185 A1* | 3/2020 | Okano | G06F 16/00 |
| 2020/0184228 A1 | 6/2020 | Ikeda | |
| 2021/0004494 A1* | 1/2021 | Veeningen | H04L 9/008 |
| 2021/0203484 A1* | 7/2021 | Veeningen | H04L 9/08 |
| 2021/0258149 A1* | 8/2021 | Kawaguchi | H04L 9/0891 |
| 2021/0314145 A1* | 10/2021 | Ikarashi | G06F 7/766 |
| 2022/0060318 A1* | 2/2022 | Ikarashi | H04L 67/10 |

FOREIGN PATENT DOCUMENTS

| | | |
|---|---|---|
| JP | 2017-103634 A | 6/2017 |
| JP | 2018-045019 A | 3/2018 |
| WO | 2015/114947 A1 | 8/2015 |
| WO | 2015/151155 A1 | 10/2015 |
| WO | 2016/178291 A1 | 11/2016 |
| WO | 2018/025831 A1 | 2/2018 |
| WO | 2018/212015 A1 | 11/2018 |

OTHER PUBLICATIONS

Algesheimer et al.; Efficient Computation Modulo a Shared Secret with Application to the Generation of Shared Safe-Prime Products; Springer-Verlog (Year: 2002).*

Bogdanov et al.; High-performance secure multi-party computation for data mining applications; Springer-Verlog (Year: 2012).*

Japanese Office Action for JP Application No. 2020-552466 dated Jun. 7, 2022 with English Translation.

International Search Report for PCT Application No. PCT/JP2018/039818, dated Jan. 22, 2019.

English translation of Written opinion for PCT Application No. PCT/JP2018/039818, dated Jan. 22, 2019.

Kazuma Ohara et al., "Fraud-detectable multiparty computing with rings of different sizes," in 2018 Symposium on Cryptography and Information Security, Niigata, Japan, Jan. 23-26, 2018, pp. 1-8.

Catrina et al., "Secure Computation with Fixed-Point Numbers", Financial Cryptography and Data Security, 14th International Conference FC 2010, Tenerife, Canary Islands, Spain, Jan. 2010, LNCS, vol. 6052, pp. 35-50.

Hamada et al., "Implementation evaluation of distributed medical statistics system by secure multiparty computation", IPSJ SIG Technical Report, Computer Security, May 19, 2016, vol. 2016-CSEC-73, No. 20, pp. 1-7.

Hara et al., "Approach for human mobility prediction by deep learning using dashcams", IPSJ SIG Technical Reports, Intelligent Transport Systems and Smart Community, Mar. 1, 2018, vol. 2018-ITS-72, No. 3, pp. 1-8.

* cited by examiner

FIG. 4

| DATE AND TIME | FEATURE VALUE INFORMATION OF FACE |
|---|---|
| 2018/1/11 11:12 | <11,23,45...> |
| 2018/1/11 11:13 | <23,14,55...> |
| 2018/1/11 11:13 | <43,11,01...> |
| ... | ... |

FIG. 11

| No. | APPARATUS A DATE AND TIME | APPARATUS B DATE AND TIME |
|---|---|---|
| 1 | 2018/1/11 11:12 | 2018/1/11 11:22 |
| 2 | 2018/1/11 11:13 | 2018/1/11 11:24 |
| ... | ... | |

MOVING xx PERSON FROM POINT 1 TO POINT 2 (AVERAGE MOVING TIME: xx MINUTES)
MOVING yy PERSON FROM POINT 2 TO POINT 1 (AVERAGE MOVING TIME: yy MINUTES)

FIG. 14

| USER ID | FEATURE INFORMATION OF FACE |
|---|---|
| xxxx0001 | <11,23,45...> |
| xxxx0002 | <23,14,55...> |
| xxxx0003 | <43,11,01...> |
| xxxx0004 | <10,23,33...> |
| xxxx0005 | <33,12,44...> |
| ... | ... |

SECURE COMPUTING SERVER, SYSTEM, SECURE COMPUTING METHOD, AND PROGRAM

This application is a National Stage Entry of PCT/JP2018/039818 filed on Oct. 26, 2018, the contents of all of which are incorporated herein by reference, in their entirety.

TECHNICAL FIELD

The present invention relates to a secure computing server, system, secure computing method, and program.

BACKGROUND

There is a technology called secure computing (Multi Party Computation; (MPC)) (see, for example, Patent Literature 1). In secure computing (secret shared computing), a plurality of parties (secure computing servers) perform various computations using secret information while hiding their own secret information.

In secure computing, shares (secret shared information) are created from information S to be kept secret and distributed to the parties participating in the secure computing. For example, when the secure computing is performed by three secure computing servers, three shares {s1, s2, s3} are randomly created from the secret information S, and one or two shares are distributed to each party. More concretely, with modulo N (N is a natural number, the same applies below), a share is randomly generated such that s1+s2+s3 mod N=S.

Nonpatent Literature 1 discloses a technique known as bit decomposition, which converts secretly shared numbers into a bit representation (binary notation).
[PTL 1]
Japanese Patent Kokai Publication No. JP2018-045019A
[NPL 1]
Kazuma Ohara, Toshinori Araki, Hikaru Tsuchida and Furukawa Jun, "Fraud-detectable multiparty computing with rings of different sizes," in 2018 Symposium on Cryptography and Information Security, Niigata, Japan, 2018, 2A1-4.

SUMMARY

The disclosure of the above PTL and NPL is incorporated herein by reference thereto. The following analysis has been made by the present inventors.

In recent years, there has been a strong demand for the protection of personal information, as represented by the General Data Protection Regulation that has begun to be enforced in Europe. For this reason, the application of secure computing, as disclosed in Patent Document 1, is considered for various systems and services that can perform arbitrary computing using data (information) that remains secret.

For example, it is being considered to install cameras at various locations such as stations and event places, and to apply secret computation to people flow analysis using face images obtained from the cameras. In the people flow analysis using cameras, for example, the images obtained from the cameras installed at stations and event places are used to identify the people in each camera. Then, the positions and times of the cameras where each person was shot are analyzed and totaled to perform a people flow analysis centered on the station or event place. Here, in order to realize the above mentioned people flow analysis, feature values are required to identify the people captured by the cameras installed at the station and the event place. However, in the current situation where privacy protection is strongly required, it is difficult for the management entities of each facility (stations and event places) to provide personal information, such as feature values extracted from facial images, to external organizations (organizations that analyze people flows). However, such problem can be solved by using secure computing. Concretely, feature values computed from images captured by cameras at stations, etc., can be set as a secret target, and multiple secure computing servers can be used for person identification and people flow analysis using the above feature values.

In addition to the above people flow analysis, there are many other systems where the application of secure computing is effective. For example, an authentication system for users of trains, etc. (face authentication system) is an example of a system to which secure computing can be effectively applied. For example, in order to implement an authentication system using face authentication, it is necessary to register the feature values obtained from the user's face image in advance in a database, and then compare (match) the feature values obtained from the camera set up at a station gate with the above mentioned pre-registered feature values. In this case, it is desirable to keep the feature values registered in the database secret from the viewpoint of personal information protection and privacy protection. Therefore, it has been considered that the features to be registered in advance can be secretly shared and used for face authentication.

As explained in the examples of people flow analysis systems and authentication systems, secret computation allows arbitrary information processing on input data while keeping the input data secret. For this reason, it is expected that the application of secure computing will increase for systems that handle personal information. On the other hand, secure computing has a tendency to take a relatively long time to obtain computation results, since communication is required between secure computing servers for example, in a multiplication process. If the system or application is tolerant of the time required to obtain the result, the above tendency of secure computing is not a problem. However, for systems that require real-time processing, such as people flow analysis and authentication systems, the above property is often not acceptable.

It is a main object of the present invention to provide a secure computing server, system, secure computing method and program that contribute to performing secret computation at high speed.

According to a first aspect of the present invention or disclosure, there is provided a secure computing server that executes shift operation to a share which is secretly shared.

According to a second aspect of the present invention or disclosure, there is provided A system including: the secure computing server as set forth above; and a controlling apparatus comprising: a requesting part that requests each of a first apparatus that keeps identification information of a first moving entity obtained at a first point and a second apparatus that keeps identification information of a second moving entity obtained at a second point to provide identification information of the first moving entity and the second moving entity to the secure computing server; a deciding part that decides a number of significant digits of identification information of the first and the second moving entity; and an instructing part that send information regarding the number of significant digits of identification information of the first moving entity and the second moving entity to the secure computing server; wherein the secure computing server executes the shift operation to identification information of the first moving entity and the second moving entity based on information regarding the significant digits notified.

According to a third aspect of the present invention or disclosure, there is provided a system comprising: the secure computing server as set forth above; and an authentication candidate extracting apparatus including: a biometric information input part that inputs biometric information obtained at a first point about authenticated entity moving from the first point to a second point; and a secret sharing controlling part that makes the biometric information shared secretly into first shared information and transmits the first shared information to the secure computing server; wherein the secure computing server further comprises: a feature information storing a part that stores secretly shared feature information that is used for process of authenticating the authenticated entity as second shared information; and a secure computation executing part that selects a candidate used for processing of authentication using the first shared information and the second shared information; wherein the authentication candidate extracting apparatus further comprises: a processing performance adjusting part that notifies information regarding the number of significant digits of the first shared information and the second shared information so as to allow to select the candidate that satisfies a predetermined required accuracy within a range that is in time for the authentication processing at the authentication apparatus that executes authentication processing using the biometric information of the authentication candidate obtained at the second point, based on a predicted time at which the authenticated entity reaches the second point from the first point; and a feature information transmitting part that transmits the feature information of the selected candidate by the secure computing server to the authentication apparatus; and wherein the secure computation executing part executes the shift operation based on the information regarding the number of significant digits of the first shared information and the second shared information, as notified.

According to a fourth aspect of the present invention or disclosure, there is provided a method of secure computing performed in a computer, the method comprising: inputting a share that is secretly shared; and executing shift operation to the share that is secretly shared.

According to a fifth aspect of the present invention or disclosure, there is provided a program wherein the program causes a computer to perform processings of: inputting a share that is secretly shared; and executing shift operation to the share that is secretly shared.

The above mentioned program can be recorded in a computer-readable storage medium. The storage medium may be a non-transient medium such as a semiconductor memory, a hard disk, a magnetic recording medium, or an optical recording medium. The present invention can be implemented as a computer program product.

According to an individual aspect of the present invention, there are provided a secure computing server, system, secure computing method and a program that contribute to performing secret computation at high speed.

BRIEF DESCRIPTION OF THE DRAWINGS

FIG. 4 is a diagram illustrating an example of data that is kept by the first apparatus of the people flow analysis system according to the first example embodiment.

FIG. 11 is a diagram to explain an operation of the people flow analysis system according to the first example embodiment.

FIG. 14 is a diagram illustrating an example of feature value information (before concealment processing) used in the second example embodiment.

PREFERRED MODES

Figure 1:
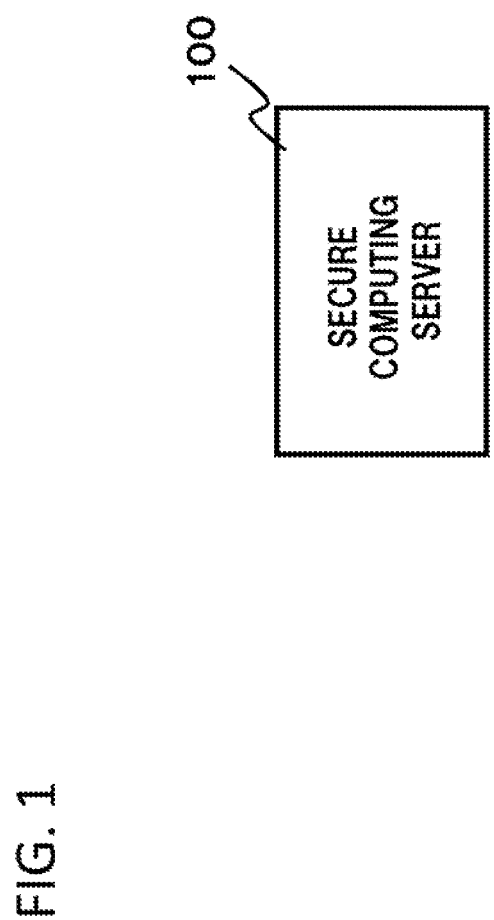
FIG. 1 is a diagram illustrating an outline of an example embodiment.

First, an outline of an example embodiment will be described. Namely, the following reference signs are merely used as examples to facilitate understanding of the outline.

Thus, the disclosure of the outline is not intended to limit in any way. In addition, connecting lines between blocks in each figure include both bidirectional and unidirectional. One-way arrow schematically shows a flow of a main signal (data) and does not exclude bidirectionality. Also, in a circuit diagram, a block diagram, an internal configuration diagram, a connection diagram, etc., there are an input port and an output port at input end and output end of connection line respectively, although not explicitly disclosed. The same applies for an I/O interface.

In this disclosure, a number of digits in a binary notation of range that a numeric value to be kept secret can take is expressed as the number of significant digits. For example, if the number of significant digits is "4," the number to be kept secret is any one of 0 to 15 (0b0000 to 0b1111). If the number of significant digits is "3," the number to be kept secret is any one of 0 to 7 (0b000 to 0b111). Furthermore, the reduction of the number of significant digits means that the number to be kept secret before the reduction of the number of significant digits is converted to a number within a range that can be expressed using the reduced number of significant digits. For example, consider the case where the number "7", which can be expressed in four digits, is reduced by one significant digit. In this case, the number 7 (0b0111) is converted to the number 3 (0b011), which can be expressed as a 3-digit binary number, to reduce the number of significant digits.

As mentioned above, there are various systems in which the application of secure computation is effective. However, there are many such systems that require a certain level of processing speed. For example, the people flow analysis system and authentication system described above are typical examples. On the other hand, as a result of intensive study by the inventors, it has turned out that there are situations in which the amount of information (number of significant digits) of secret information can and should be suppressed in the above mentioned people flow analysis systems.

For example, the purpose of a people flow analysis system is to grasp the general flow of people, and it does not require the accuracy of person identification required by authentication systems such as those used for payment when purchasing goods. In other words, in a people flow analysis system, it is acceptable to determine whether or not the person in one camera is the same person as the person in another camera, even if the accuracy is a little low. Therefore, the impact of determining the person after reducing the amount of information in the feature values used to identify the person, that is, the number of significant digits in the feature values (each element of the feature vector) obtained from each camera, is insignificant. It can also be said that if the accuracy of the feature values obtained from the images is too high, it will be easier to identify individuals, and therefore, from the viewpoint of privacy protection, it is better to reduce the number of significant digits of the feature values.

In authentication systems used at ticket gates in stations, the number of users varies greatly depending on the time of day. It is not acceptable to reduce the accuracy of authentication or to spend a long time for authentication just because the number of users varies greatly. Therefore, the implementation of two-step authentication (provisional authentication and full authentication) using features obtained from cameras installed at different locations has been studied. Concretely, a camera is installed on the platform of a station, etc., and multiple features that are candidates for authentication are extracted from the pre-registered features, using the feature values of the images acquired from the camera. In addition, the person standing at the ticket gate is authenticated (main authentication) by comparing each of the above multiple feature values with the feature values obtained from cameras installed near the ticket gate. By performing such two-step authentication, it is possible to achieve both authentication accuracy and authentication time according to the number (large or small) of users. For example, when there are many users, such as during the morning and evening rush hours, the time it takes for a user to move from the platform to the ticket gate becomes longer. Therefore, there is no problem even if it takes a relatively long time for the first authentication (provisional authentication; extraction of multiple candidates). On the other hand, when there are few users, the time for users to move from the platform to the ticket gate is short. Therefore, the first authentication should be completed in a short time. In authentication by comparing feature values (feature vectors), if the number of significant digits of each feature is large, the processing time is long, and if the number of significant digits is small, the processing time is short. In other words, in an authentication system where the features are secretly shared and two-step authentication is performed, it is effective to reduce the number of significant digits of the features for the purpose of completing the first authentication in a short time.

As described above, as for the systems in which the application of secure computing is suitable, there are systems in which it is permissible to perform the original processing (e.g., person identification processing) after reducing the number of significant digits of the numeric value to be kept secret. Here, in normal processing that does not use secure computing, it is relatively easy to reduce the number of significant digits of a number. For example, consider the case where the number of digits of "7", expressed in four digits, is to be reduced by one. In this case, the number "7" is written in binary as "0b0111", and the number of digits of the number "7" can be reduced by extracting the upper three bits (the number 7 is converted to the number 3).

However, in the secure computing, the secret information concerned, numerical value 7, is distributed and placed in each secure computing server as a share. Therefore, a process called "bit decomposition" disclosed in Non Patent Literature 1 is required to represent the secret numerical value 7 in binary notation. In addition, the extraction and rearrangement of the upper three bits of the bit-decomposed number 7 requires a process called "bit-connecting (ring composition protocol)" disclosed in Non Patent Literature 1. As disclosed in the Non Patent Literature 1, in order to execute the above bit decomposition and bit connecting, coordination (communication) between each secure computing server is required, and the said processing requires a considerable amount of execution time.

When reducing the number of significant digits of the secret information, if the algorithm used in the above normal computation is brought into the secure computing, bit decomposition and bit connecting will be required, and even if the number of significant digits of the secret information is reduced, the effect (improvement in execution speed) might not be as great as expected for the system as a whole. Furthermore, in some cases, the increase in execution time required to reduce the number of significant digits may exceed the decrease in execution time due to reduction in number of significant digits of information. In other words, although secure computing allows arbitrary operations on secret numerical values, due to the peculiar fact that secret information is shared among secure computing servers, there may be caused a possibility that the use of algorithms used in ordinary computing may degrade the performance of the system.

The secure computing server 100 according to an example embodiment shown in FIG. 1 reduces the number of significant digits of secret information without substantially affecting the execution time of the system, in view of the peculiarities of the secure computing described above. Concretely, when it is necessary to reduce the number of significant digits of the secret information, the secure computing server 100 performs a shift operation on the share generated from the secret information (the share corresponding to the secret information) in a direction in which the number of significant digits of the secret information is reduced. For example, the secure computing server 100 performs a right shift operation on the share to be reduced in the number of digits corresponding to the number of digits to be reduced.

As described above, communication between secure computing servers is necessary for processings such as multiplication etc., however, communication between the servers concerned is not necessary for shift operations on shares. Therefore, the execution time required for digit reduction (cutting out the upper bits) is short, and the effect of reducing the number of digits in the secret information can be maximized. In other words, the secure computing server 100 can reduce the number of significant digits of the secret information in a short time, and the execution time of the entire system can be shortened by the reduction of the number of significant digits.

Since some information is discarded by the execution of the above shift operation, there is a concern about an increase in the error associated with the reduction in the number of significant digits. However, the error caused by the shift operation is limited to the value corresponding to the number of secure computing servers 100, regardless of the shift amount (the number of digits to be shifted to the right). For example, when the secure computing is performed by three secure computing servers, the error that can be caused by reducing the number of significant digits by the shift operation is limited to "−2" at most. In other words, when the number of significant digits is reduced by the shift operation, an error of up to "2" can occur in absolute value, but the magnitude of the error can be said to be insignificant if the value of the secret information is sufficiently large. However, if the value of the secret information is sufficiently large, the effect of the error is insignificant. In other words, if the natural number N used to generate the share from the secret information is sufficiently large and the number of digits to be shifted to the right is relatively small, the error entailed by the reduction in the number of significant digits is small, and the influence is also small.

The reason for the above limitation of the error caused by reducing the number of significant digits by shift operation is as follows.

Let the number of secure computing servers 100 be K (K is a natural number, the same below). In this case, K shares $\{s_1, s_2, \ldots, s_K\}$ are generated from secret information S. The modulo N for generating the shares is a power of 2 ($2^n$). The modulo N may be a prime number instead of a power of 2. Under the above conditions, each share can be expressed in binary notation as shown in Expression (1) below.

$$s_1 = a_{(1,n)}, \ldots, a_{(1,i+1)}, a_{(1,i)}, \ldots, a_{(1,1)} \quad \text{[Expression 1]}$$

$$s_2 = a_{(2,n)}, \ldots, a_{(2,i+1)}, a_{(2,i)}, \ldots, a_{(2,1)}$$

$$\vdots$$

$$s_K = a_{(K,n)}, \ldots, a_{(K,i+1)}, a_{(K,i)}, \ldots, a_{(K,1)}$$

In the above expression (1), i is a suffix (index) to identify the bit position of the share in binary notation (bit decomposition).

In expression (1) above, consider the case where the number of significant digits of n-digit secret information S is reduced by i digit(s). In expression (1), the numerical value Su indicated by the bits higher than the i-digit of each share is denoted as in the following expression (2).

$$S_{(1,U)} = \quad \text{[Expression 2]}$$

numerical value of the upper bits $\{a_{(1,n)}, \ldots, a_{(1,i+1)}\}$.

$S_{(2,U)}$ = numerical value of the upper bits $\{a_{(2,n)}, \ldots, a_{(2,i+1)}\}$.

$$\vdots$$

$$S_{(K,U)} =$$

Numerical value of the higher bits $\{a_{(K,n)}, \ldots, a_{(K,i+1)}\}$.

Similarly, the numerical value SL indicated by the lower bits of the i-digit or lower of each share is denoted as shown in expression (3) below.

$$S_{(1,L)} = \quad \text{[Expression 3]}$$

numerical value of the lower bits $\{a_{(1,i)}, \ldots, a_{(1,1)}\}$.

$S_{(2,L)}$ = numerical value of the lower bits $\{a_{(2,i)}, \ldots, a_{(2,1)}\}$.

$$\vdots$$

$$S_{(K,L)} =$$

numerical value of the lower bits $\{a_{(K,i)}, \ldots, a_{(K,1)}\}$.

After the number of digits is reduced, the secret information S' can be computed as the following expression (4).

$$S_{(1,U)} + S_{(2,U)} + \ldots + S_{(K,U)} \bmod (n-i) \quad \text{[Expression 4]}$$

Expression (4) indicates that the remainder of the result of dividing the sum of the numerical values determined from the bits higher than the i digit by the number of digits after digit reduction (n−i) becomes the secret information S'.

Using the notation in expression (2) and expression (3), the secret information S can be expressed as the following expression (5).

$$S_{(1,U)} + S_{(1,L)} + \ldots + S_{(K,U)} + S_{(K,L)} \bmod N \quad \text{[Expression 5]}$$

By referring to expressions (4) and (5), it can be understood that the values to be inherently carried to a position above (higher than) the i-digit due to the addition of the numerical values of the i-digit or lower of each share are lost through the reduction of the number of significant digits, and thus the numerical values to be carried become errors entailed by the reduction of the number of significant digits. It can also be understood that the maximum value of the numerical value that carried to above the i-digit is the case where each numerical value shown in expression (3) is the maximum, and the minimum value of the numerical value that increases above the i-digit is the case where each numerical value shown in expression (3) is the minimum. The maximum value of each numerical value shown in expression (3) is when all bits of each numerical value in binary notation are "1". In case where secure computation is executed by K secure computation servers, the maximum value of the numerical value to be carried is "K−1", which will become an absolute value of the maximum error. For example, if K=3, the absolute value of the error is "2".

Note that, as is clear from the above explanation, the error caused by the reduction in the number of significant digits is the value that was scheduled to be added to the higher-order value due to the reduction in the number of significant digits. Therefore, the difference (error) between the converted value (the value in which the digits to be carried are truncated) and the true value (the value in which the digits to be carried are correctly reflected) will be a negative value.

In the following, explanation will be given on the reduction of the number of effective digits of the secret information S by the secure computing server 100 with reference to a concrete numerical example. In doing so, the secret information S is assumed to be a 4-bit value (N=16, n=4), and a case of converting the 4-bit information S to a 3-bit value (N=8, n=3) will be explained. The number of secure computing servers 100 is assumed to be "3", and the secret information S is assumed to be "7". In this case, the numerical value "3" is the value for which the number of significant digits is reduced without error.

Numerical Example 1

When the secret information S is "7," for example, three shares are generated as shown below. The binary value of each number is written together in parentheses.

$s_1=5(0b0101)$ $s_2=7(0b0111)$ $s_3=11(0b1011)$

Each secure computing server 100 shifts its own share by one bit to the right in order to convert the 4-bit secret information S into 3-bit secret information S'. The share obtained as a result of this shift operation is as follows.

$s_1'=2(0b010)$ $s_2'=3(0b011)$ $s_3'=5(0b101)$

In this case, the secret information S' after the number of significant digits is reduced is computed as $s_1'+s_2'+s_3'$ mod 8=2 (0b010). Therefore, if the share is created as in the numerical example 1, there will be an error of "−1".

Numerical Example 2

If the secret information S is "7" as in numerical example 1, each share could be generated as follows.

$s_1=6(0b0110)$ $s_2=7(0b0111)$ $s_3=10(0b1010)$

Each secure computing server 100 shifts its own share by one bit to the right. The share obtained as a result of this shift operation is as follows.

$s_1'=3(0b011)$ $s_2'=3(0b011)$ $s_3'=5(0b101)$

In this case, the secret information S' after the number of significant digits is reduced is computed as $s_1'+s_2'+s_3'$ mod 8=3 (0b011). Therefore, when the share is created as in the numerical example 2 in question, there is no error.

In the following, a more detailed description of concrete example embodiments will be given with reference to the drawings.

First Example Embodiment

A first example embodiment will be described in more detail with reference to the drawings.

Figure 2:
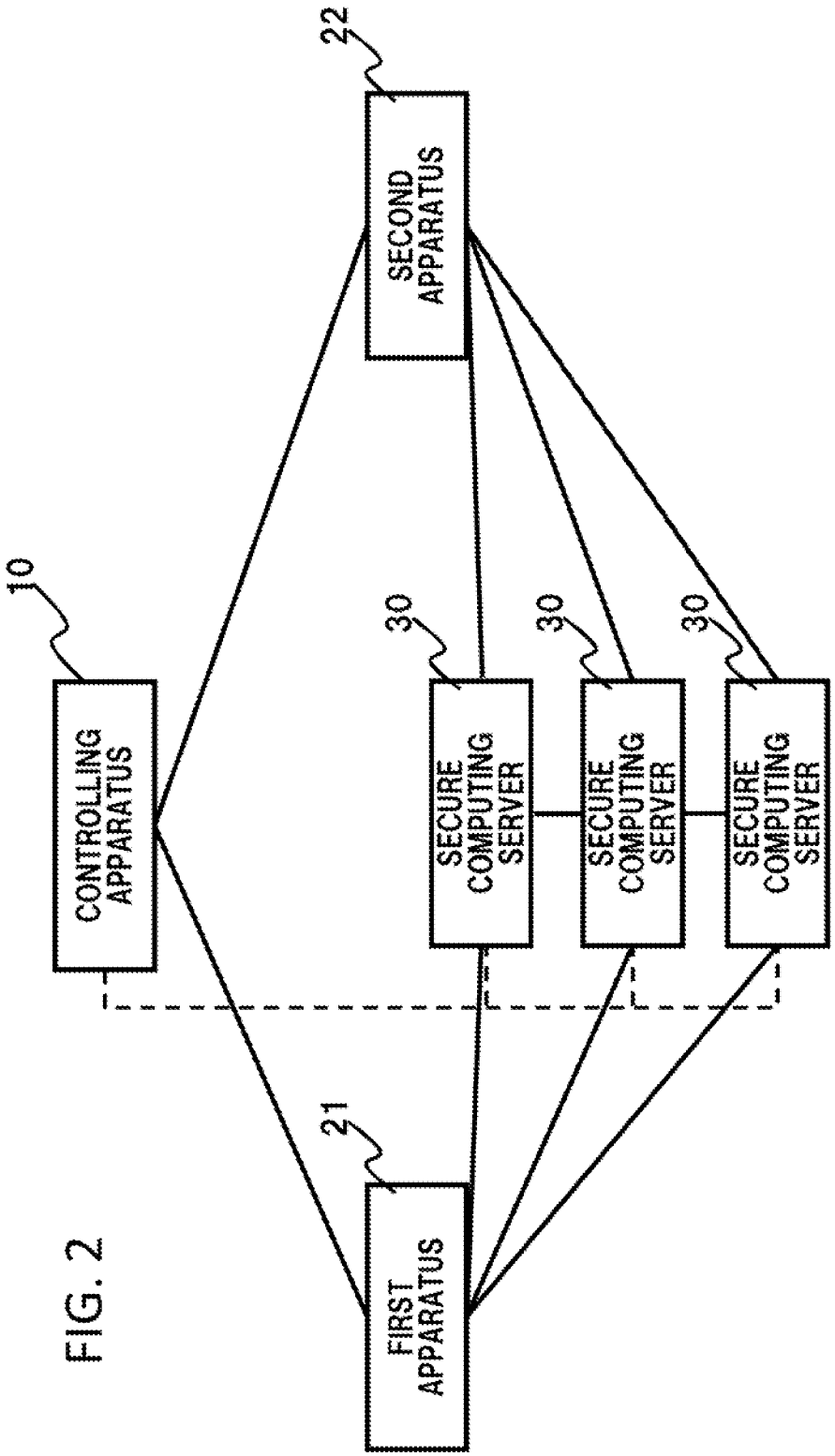
FIG. 2 is a diagram illustrating an example of a schematic configuration of a people flow analysis system according to a first example embodiment.

FIG. 2 is a diagram illustrating an example of a schematic configuration of a people flow analysis system according to a first example embodiment. Referring to FIG. 2, a configuration that a first apparatus 21, a second apparatus 22, and three of secure computing servers 30 are connected to a controlling apparatus 10 is illustrated.

The first apparatus 21 stores the facial feature values data of pedestrians obtained from images shot by cameras installed in stations and various facilities as identification information of a first moving entity acquired at a first point.

The second apparatus 22 stores facial feature values data of pedestrians obtained from images shot by cameras installed at stations and various facilities different from the first point as identification information of a second moving entity acquired at a second point.

Here, the first apparatus 21 and the second apparatus 22 are managed by different management entities (including different data management managers in the same organization). In addition, it is assumed that the identification information of the first and second moving bodies are managed and operated in such a way that data of the identification information is not released to the outside, respectively. In other words, the identification information of the first and second moving bodies are data acquired under their own separate management entities, and are managed under the conditions that they are not released to the outside, or are discarded after lapse of a specified period of time, or the like.

The three secure computing servers 30 receive the secretly shared (distributed) share information of the facial feature values data from the first and second apparatus 21 and 22, respectively, and perform the computation of the secret sharing method.

The control apparatus 10 instructs the first 21 and second 22 apparatuses to transmit share information to the secure computing server 30, and instructs the secure computing server 30 to perform computations, etc. using the share information. Furthermore, the control apparatus 10 comprises a function for adjusting the number of significant digits of the facial feature value data for each secure computing server 30. For example, the adjustment by the significant digit adjustment function is truncation of the number of digits of a predetermined number or lower in each element value of the feature vector, which is the facial feature value data.

Figure 3:
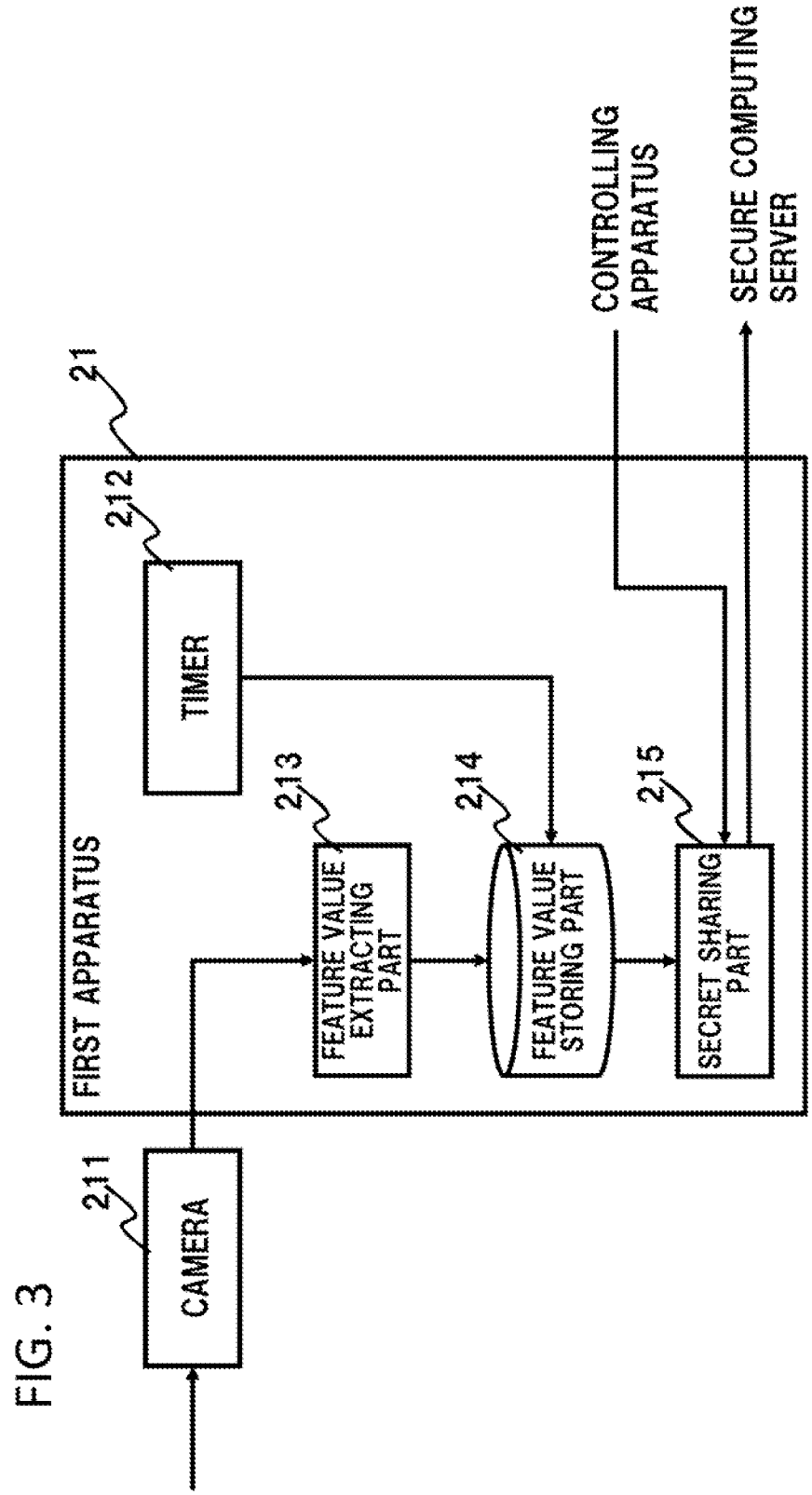
FIG. 3 is a diagram illustrating an example of a schematic configuration of a first apparatus of the people flow analysis system according to the first example embodiment.

FIG. 3 is a diagram illustrating a configuration of the first apparatus of the people flow analysis system of the first example embodiment of the present invention. Referring to FIG. 3, a configuration with a timer 212, a feature value extracting part 213, a feature value storing part 214, and a secret sharing part 215, connected to a camera 211, is illustrated.

The camera 211 is a security camera installed in a station or various facilities. The timer 212 is used to record the date and time of shooting. In the example of FIG. 3, the number of cameras is one, but there is no limit to the number of cameras. For example, the cameras may be configured so that video data can be acquired by switching between cameras for daytime shooting and cameras for nighttime shooting. Also, for example, a configuration in which multiple cameras with different angles of view and shooting directions are arranged may be acceptable.

The feature value extracting part 213 clips an image from the video data captured by the camera 211 and extracts the facial feature value data of a person(s) in the image. In the case where multiple faces of people are captured in a single image, the feature value extracting part 213 identifies areas of each person's face from a single image and extracts multiple facial feature value data.

The feature value storing part 214 stores the facial feature value data extracted by the feature value extracting part 213 with date and time information obtained from the timer 212.

FIG. 4 is a diagram illustrating an example of the facial feature value data stored in the feature value storing part 214. The example in FIG. 4 shows an example of storing an entry that maps the date and time supplied by the timer 212 to the facial feature value information (facial feature value data). The 11, 23, 45 . . . of the facial feature value information represent the feature vectors between predetermined facial features (face nodes).

In response to a request from the controlling apparatus 10, the secret sharing part 215 retrieves the facial feature value data from the feature value storing part 214, generates share information for sending to the secure computing server 30, and transmits it to the secure computing server 30.

The first apparatus 21 as described above can also be implemented by adding the secret sharing part 215 to the apparatus for people flow analysis using face authentication data in the same organization (facility). The second apparatus 22 has the same configuration as the first apparatus 21 except that it is provided with a camera that has at least a different shooting area from that of the camera 211, so the description is omitted.

Figure 5:
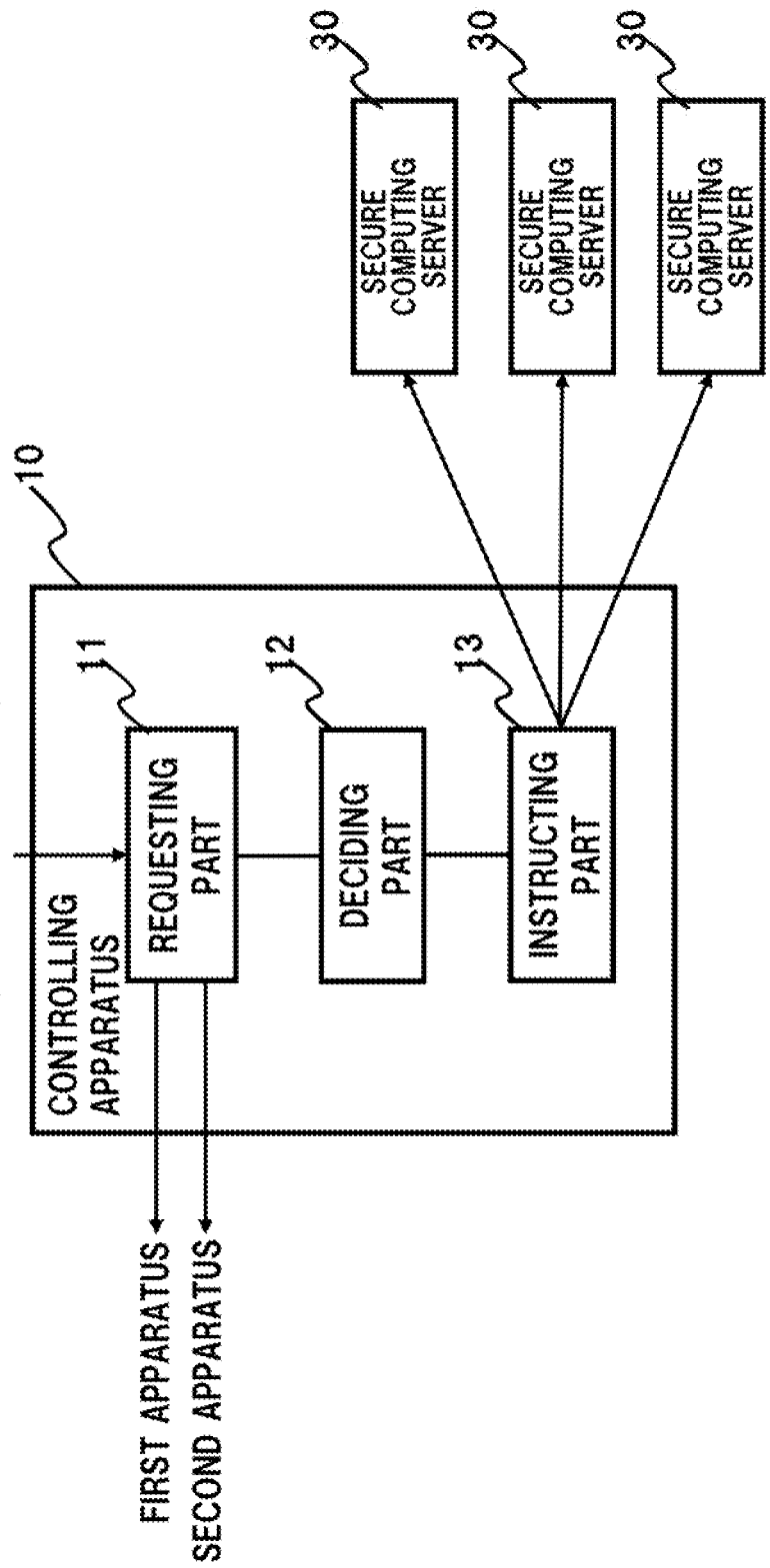
FIG. 5 is a diagram illustrating a schematic configuration of a controlling apparatus of the people flow analysis system according to the first example embodiment.

Next, the configuration of the control unit 10 will be described in detail with reference to the drawings. FIG. 5 is a diagram illustrating a configuration of the controlling apparatus of the people flow analysis system of the first example embodiment of the present invention. Referring to FIG. 5, the configuration is illustrated with a requesting part 11, a deciding part 12, and an indicating part 13.

The requesting part 11 requests the first and second apparatuses 21 and 22 to generate and transmit share information for transmitting to the secure computing servers 30, based on the predetermined conditions for starting people flow analysis. The conditions for starting people flow analysis can be conditions such as performing people flow analysis of a certain accuracy based on videos shot at a first and second location at constant time intervals in past certain period(s) of time. The conditions for starting people flow analysis may be not only periodic as described above, but may also be conditional on receiving an explicit instruction from the user requesting temporary people flow analysis, for example.

The deciding part 12 determines the number of significant digits of the share information (identification information of a moving entity) used by each secure computing server 30 for people flow analysis according to the system status and instructions from the user. The deciding part 12 notifies the instructing part 13 of the determined number of significant digits. For example, it is assumed that the time required for people flow analysis in the case where the number of digits is not reduced (when the share information supplied by the first and second apparatuses 21 and 22 is used as it is) is 30 minutes, while the processing speed (time required) for people flow analysis requested by a user is 15 minutes. In this case, the deciding part 12 determines the significant digits of the share information (each element of the feature vector forming facial feature value data) used by each secure computing server 30 for the secure computing from X digits to Y digits. The determination of the number of significant digits by the deciding part 12 can be implemented by observing in advance a relationship between the processing time required for the system and the effect (reduced time) obtained by reducing the number of significant digits, and storing the relationship in the controlling apparatus 10. Alternatively, a function may be defined such that processing time required for the system is input and the reduction time obtained by reducing the number of significant digits is output, and the number of significant digits may be determined using the function.

Thus, the deciding part 12 determines the number of valid digits of the share information so that the processing using the share information (identification information of the moving entity) by the secure computing servers 30 will be completed within a predetermined time (within 15 minutes in the above example).

The instructing part 13 instructs the secure computing server 30 to execute the secure computing process at a timing when the generation and transmission of the share information by the above requesting part 11 is completed. At that time, the instructing part 13 includes the information regarding the number of significant digits determined by the above described deciding part 12 in the instruction for executing people flow analysis, and notifies the secure computing servers 30 of the information. For example, the instructing part 13 may notify the number of significant digits itself, or may notify the number of digits to be reduced by the secure computing servers 30. In the latter case, the instructing part 13 calculates the number of significant digits to be reduced in each secure computing server 30, and includes the computed number of significant digits to be reduced in the people flow analysis execution instructions. As described above, when the number of significant digits is changed from X digits to Y digits, the indicating part 13 instructs each secure computing server 30 to reduce the number of digits by (X−Y) digits.

Since the first 21 and second 22 apparatuses are managed by different management entities, the number of digits in the share information transmitted by each apparatus may not necessarily be the same, but may be different. In such a case, the controlling apparatus 10 may instruct the number of significant digits to be reduced for each of shares obtained from each apparatus so that the number of significant digits of shares supplied by each apparatus is the same. For example, the controlling apparatus 10 may instruct each secure computing server 30 to reduce X1−Y1 digits for the share obtained from the first apparatus 21, and to reduce X2−Y2 digits for the share obtained from the second apparatus 22.

Figure 6:
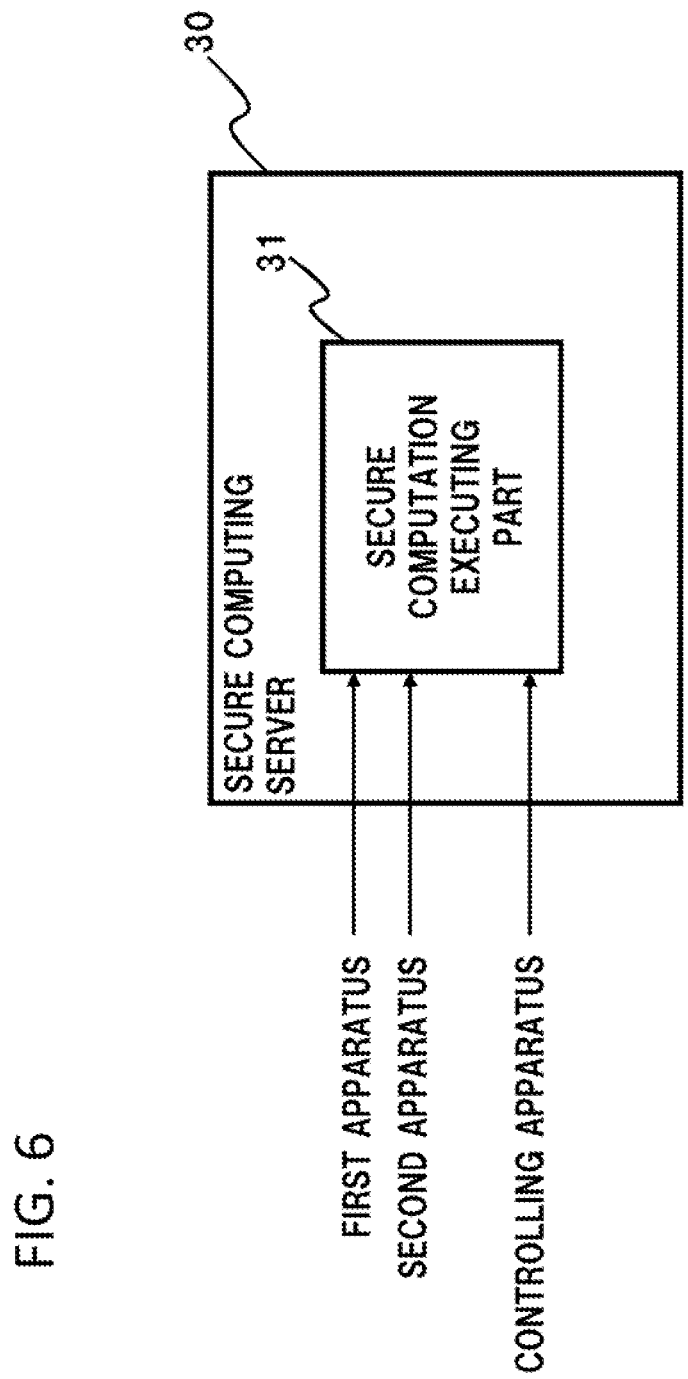
FIG. 6 is a diagram illustrating a schematic configuration of a secure computing server of the people flow analysis system according to the first example embodiment.

Next, the configuration of the secure computing server 30 will be described in detail with reference to the drawings. FIG. 6 is a diagram illustrating a configuration of the secure computing server of the V flow analysis system of the first example embodiment of the present invention. Referring to FIG. 6, the configuration with a secure computation executing part 31 is illustrated.

The secure computation executing part 31 obtains share information (facial feature values data and feature vectors) from the first and second apparatuses 21 and 22. In addition, the secure computation executing part 31 obtains the "people flow analysis execution instructions" from the controlling apparatus 10. The secure computation executing part 31 checks the information on the number of significant digits contained in the people flow analysis execution instructions. If the information includes the number of significant digits to be reduced, the secure computation executing part 31 performs a right-shift operation on the share information in the number equivalent to the number of significant digits to be reduced. Alternatively, if the number of significant digits itself is included in the people flow analysis execution instructions, the secure computation executing part 31 calculates the difference between the current number of significant digits and the number of significant digits included in the instructions, and executes a right shift of the number of digits corresponding to the difference value for the share information.

After adjusting the number of significant digits, the secure computation executing part 31 executes the process concerning the people flow analysis using the share information.

Note that the secure computation executing part 31 performs people flow analysis including the above significant digit reduction process by executing the secure computation circuit (secure computation program) obtained in advance from the controlling apparatus 10, etc.

Figure 7:
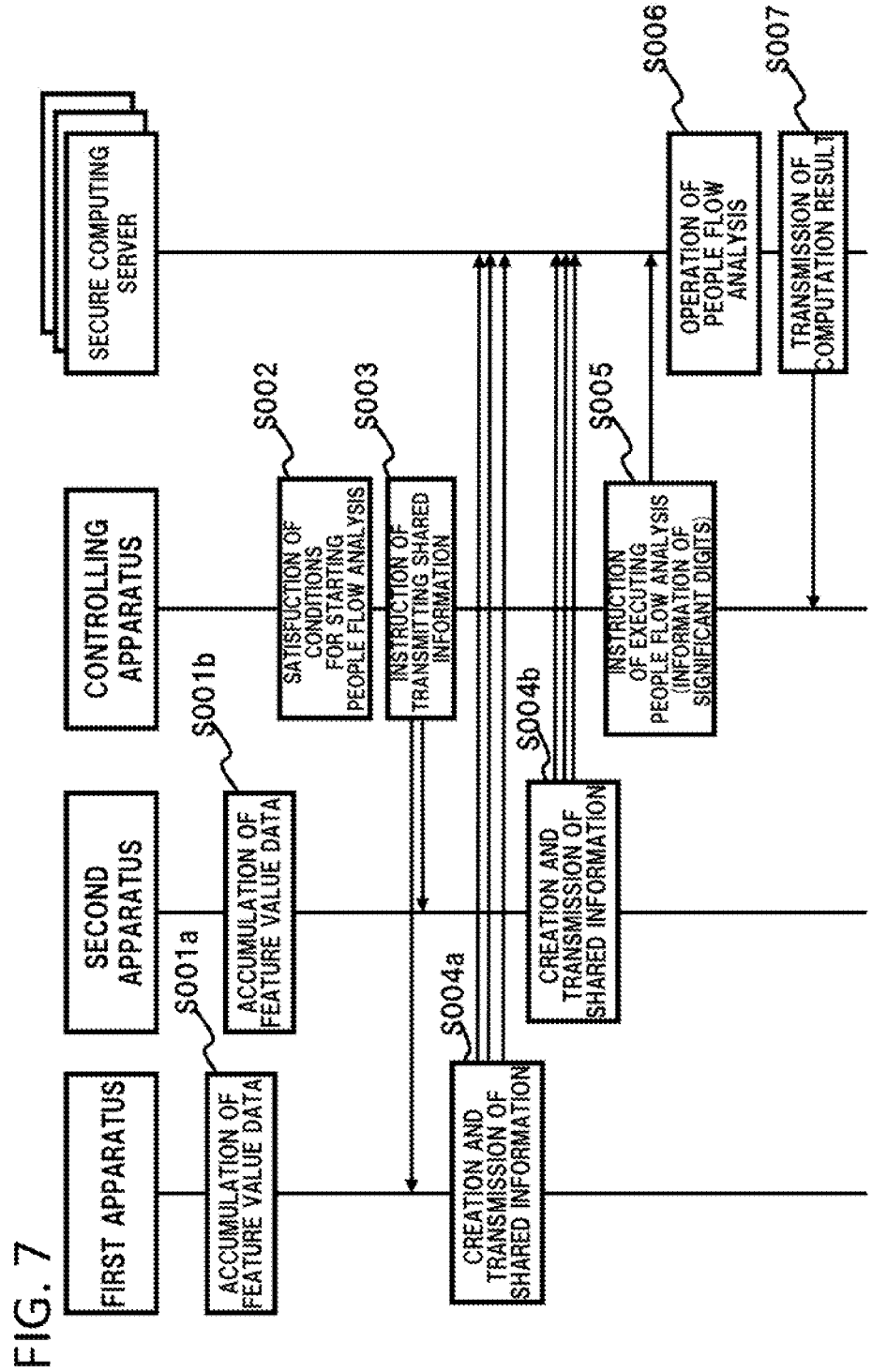
FIG. 7 is a sequence diagram illustrating an operation of the people flow analysis system according to the first example embodiment.

Next, operation of this embodiment will be described in detail with reference to the drawings. FIG. 7 is a sequence diagram illustrating operation of the people flow analysis system of the first example embodiment of the present invention.

Referring to FIG. 7, the first step is to accumulate feature value data (facial feature data) in the first and second apparatuses 21 and 22, respectively (steps S001*a* and S001*b*).

Then, when the predetermined conditions for starting people flow analysis are satisfied (Step S002), the controlling apparatus 10 instructs the first and second apparatus 21 and 22 to transmit the share information to the secure computing server(s) 30, respectively (Step S003).

Based on the instructions from the controlling apparatus 10, the first and second apparatuses 21 and 22 retrieve the facial feature value data from the feature value storing part 214, generate the share information for transmitting to the secure computing server 30, and transmit it to the secure computing server 30, respectively (Steps S004*a* and S004*b*).

Next, the controlling apparatus 10 instructs the secure computing server(s) 30 to execute the people flow analysis using the share information (people flow analysis execution instruction; step S005). At that time, the controlling apparatus 10 includes information regarding the significant digits (significant digits information) in the execution instructions.

Next, the secure computing servers 30 that have received instructions to execute the secure computation cooperate with each other to execute the people flow analysis process using share information (Step S006). At that time, each secure computing server 30 adjusts the number of significant digits as instructed by the controlling apparatus 10. For example, each secure computing server 30 performs a right shift operation of the instructed number of digits on the share information. Concrete examples of the people flow analysis process will be described in detail later using FIG. 8 through 11.

Finally, the secure computing server(s) 30 transmits the results of the people flow analysis (computation results) to the controlling apparatus 10 (Step S007). In the example of FIG. 7, the secure computing server 30 transmits the results (computation results) of the people flow analysis to the controlling apparatus 10, but the destination of the results (computation results) of the people flow analysis may be other than the controlling apparatus 10. For example, the results of the people flow analysis (computation results) may be transmitted to the first and second apparatuses 21 and 22, which are the providers of the facial feature data. In this way, a management entity of the first and second apparatuses 21 and 22 can use the results of the people flow analysis (computation results) to improve the operation of the facility and the information display for visitors. In addition, the management entities of the first and second apparatuses 21 and 22 can obtain the results (computation results) of the above mentioned people flow analysis without giving the facial feature data to each other.

In the following, a concrete example of the people flow analysis process in step S006 above will be explained.

[Totaling of Number of People Moving]

Figure 8:
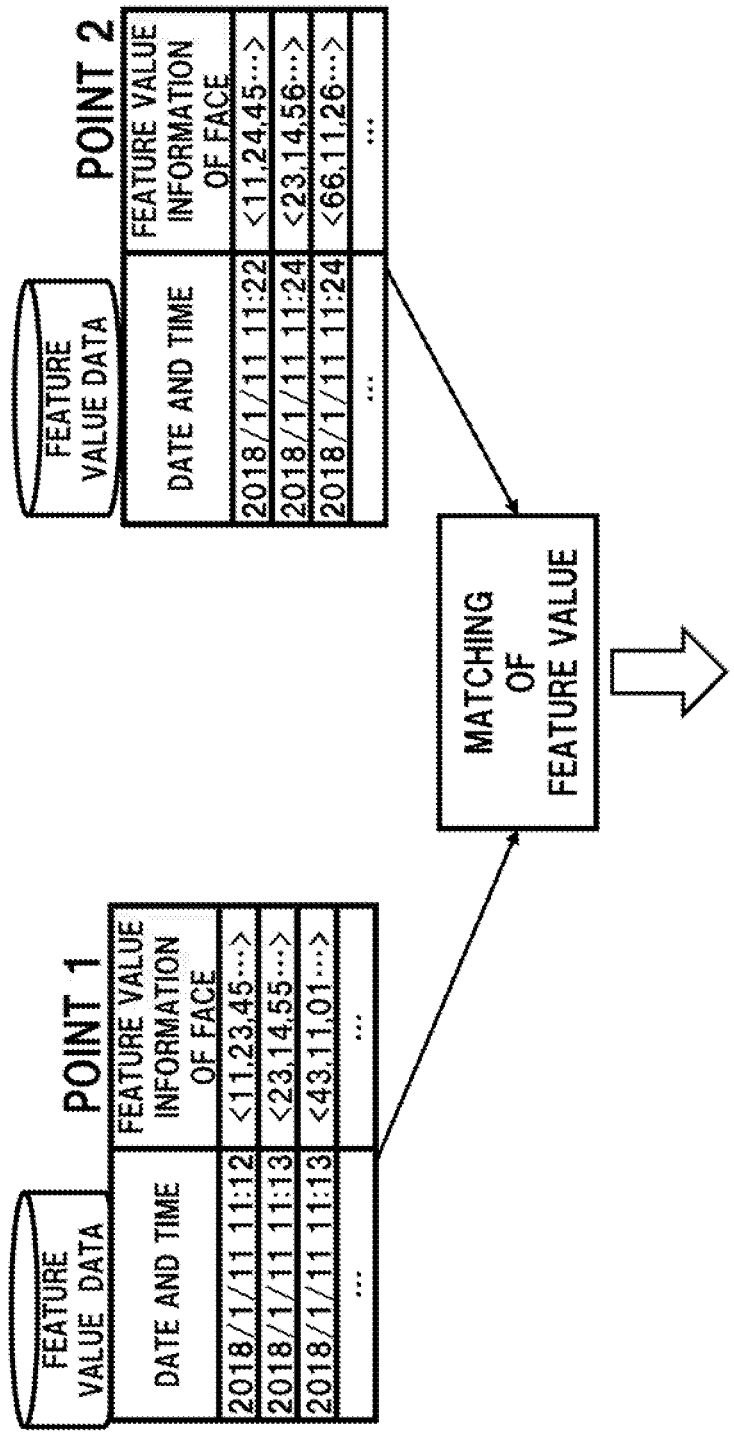
FIG. 8 is a diagram to explain an operation of the people flow analysis system according to the first example embodiment.

FIG. 8 illustrates an example of matching a person who appears in a camera at point 1 with a person who appears in a camera at point 2. For example, as shown in FIG. 8, by matching the facial feature data between 11:00 and 11:30 on Jan. 11, 2018, the number of people who moved between point 1 and point 2 can be computed. By using the secret sharing method, it is possible to have desired calculation processes performed on individual secure computing servers 30 while keeping the original facial feature data unrecoverable. For example, if the point 1 is station A and the point 2 is ballpark B (stadium B), each management entity can obtain a result that XX people have moved from the station A to the ballpark B (stadium B) while keeping the facial feature data acquired at station A and the facial feature data acquired at the ballpark B (stadium B) secret. In addition, since the results do not contain personal information, they can be sold to a third party for a fee. The facial feature data can be matched by computing the distance between two feature vectors and comparing the value with a specified threshold.

[Totaling of Time Required]

Figure 9:
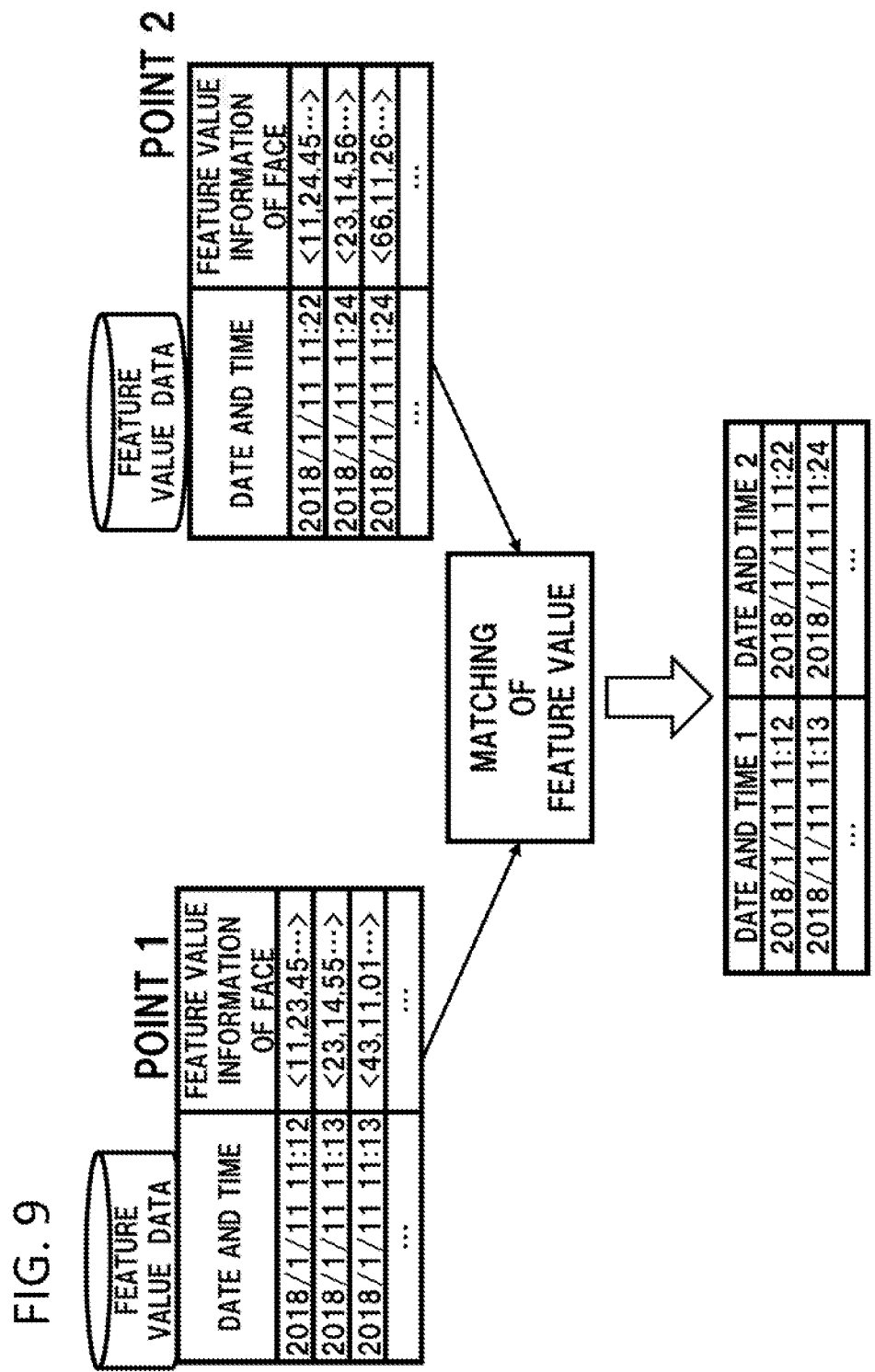
FIG. 9 is a diagram to explain an operation of the people flow analysis system according to the first example embodiment.

FIG. 9 illustrates an example of matching a person who appeared in a camera at point 1 with a person who appeared in a camera at point 2, combining the data, and totaling the time required. For example, as illustrated in FIG. 9, by matching facial feature data for a specific time period, it is possible to identify a person who appeared at both point 1 and point 2. The difference in the time when the person was shot can then be used to determine the time required for the person to move between point 1 and point 2. Similarly, if, for example, point 1 is station A and point 2 is ballpark B (stadium B), it is possible to obtain a result that the average time required for a person to travel from the station A to the ballpark B (stadium B) is XX minutes, while keeping the facial feature data managed by each management entity secret. In addition, since the results do not contain personal information, they can be sold to a third party for a fee. At this time, as shown in FIG. 9, it is preferable that the facial feature data is deleted from the combined data so that the individual cannot be identified.

[People Flow Analysis]

Figure 10:
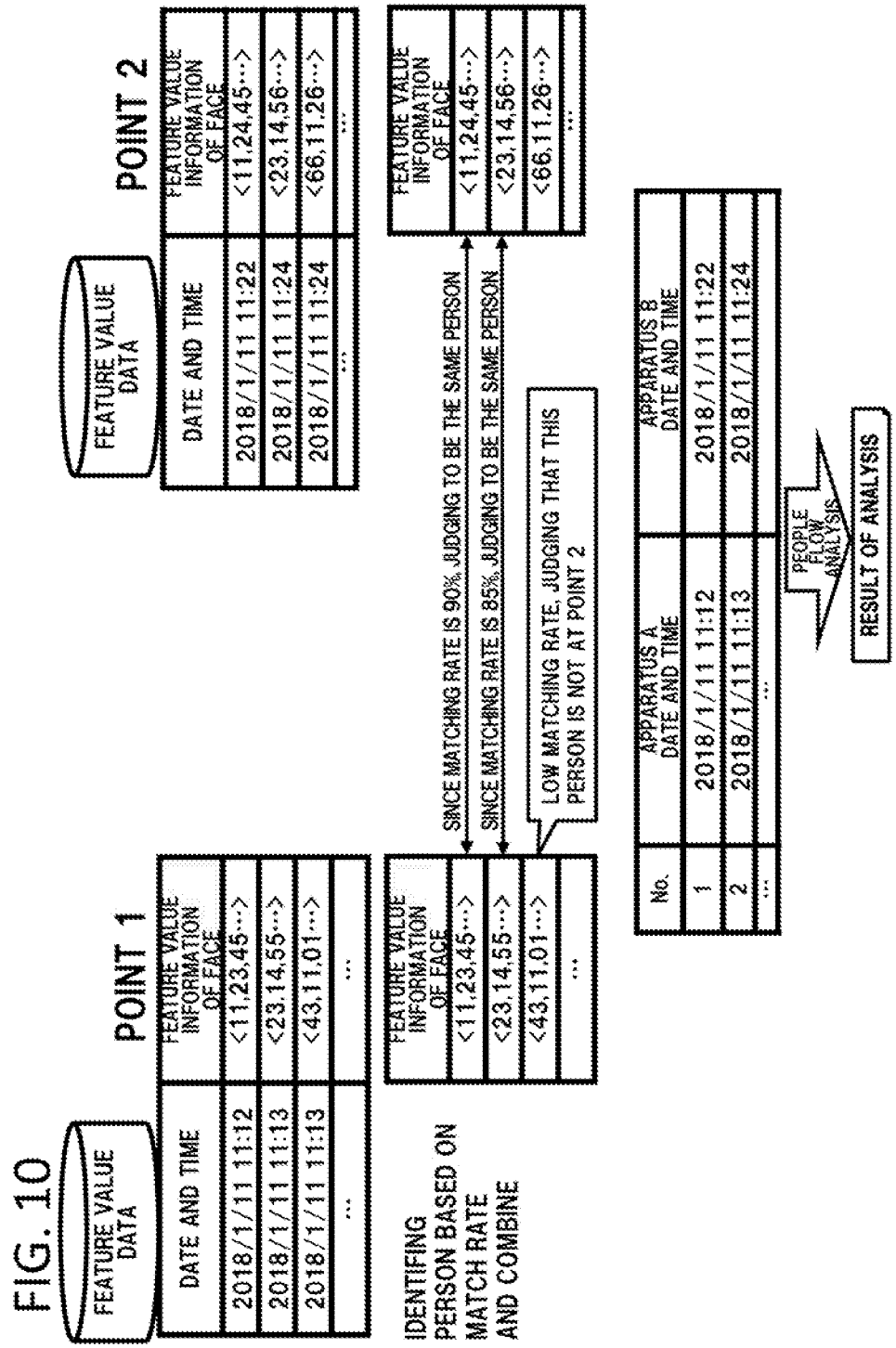
FIG. 10 is a diagram to explain an operation of the people flow analysis system according to the first example embodiment.

FIG. 10 shows an example of matching a person who appears in a camera at point 1 with a person who appears in a camera at point 2, combining data, and creating a list of required times for each person. In addition, the example in FIG. 10 illustrates a result of people flow analysis based on the created list of required times for each person. In the example of the result of people flow analysis shown in FIG. 11, it is possible to obtain information such as number of people who moved from point 1 to point 2 and their average travel time using the list of time required for each person. At this time, as illustrated in FIG. 10 and FIG. 11, it is preferable that the facial feature data is deleted from the analysis results and individuals cannot be identified by anonymization process such as No. 1 and No. 2. Similarly, for example, if Point 1 is Station A and Point 2 is Ballpark B (Stadium B), it is possible to obtain the result that XX people traveled from the Station A to the Stadium B (Stadium B) and the average time required is XX minutes, while keeping the facial feature data managed by each management entity secret. This information can be used for security purposes. Such information can then be used for safety and hospitality by optimizing placement of guards and guides, and for tourism and town planning based on analysis of tourist behavior trends. Therefore, it can be said that the people flow analysis system of the present invention functions as a system that can perform various types of analysis on the movement of moving bodies.

Note that the threshold value (match rate) for determining same person in FIGS. 8 to 10 above can be set appropriately according to the required accuracy and camera resolution. For example, in FIG. 10, the same person is judged to be the same person when a match rate of 85% or higher is obtained, but if a stricter judgment is required, the person may be judged to be the same person when the match rate is 90% or higher. If the resolution of the camera is low or the shooting location is dark and the image quality is degraded, the person may be judged as the same person when the matching rate is 70% or higher. In this way, the threshold (matching rate) can be adjusted according to the accuracy (quality) of facial feature data and accuracy of the required analysis results.

Note that in the above example, the facial feature data is described as being stored with date and time information associated with it, but it is not necessary to associate date and time information with each individual facial feature data. For example, the facial feature data recognized in a certain time period may be stored in the feature value storing part 214.

In addition, according to this example embodiment, by adjusting the number of digits of the share information used by the secure computing servers 30, it is possible to provide the results of people flow analysis that satisfy required processing speed and processing accuracy. For example, this example embodiment can be preferably applied to an application where a flow of people in the last 30 minutes from point 1 (the first point) to point 2 (the second point) is to be grasped within 15 minutes in order to estimate the number of persons required to reinforce security at point 2. Similarly, for example, this system can be used to estimate an amount of products to be sold at an event site at point 1, and to determine the flow of people from point 2 (the second point) to point 1 (the first point) in the last hour, within 10 minutes.

In addition, there may be a need to reduce accuracy in determining identity of a person from the viewpoint of privacy protection as well as to reduce processing time. In this case, the accuracy of the person identity determination can be reduced by reducing number of significant digits in the face feature data.

Second Example Embodiment

A second example embodiment will be described in more detail with reference to the drawings. The second example embodiment describes a case where reduction of number of significant digits is applied to an authentication system.

Figure 12:
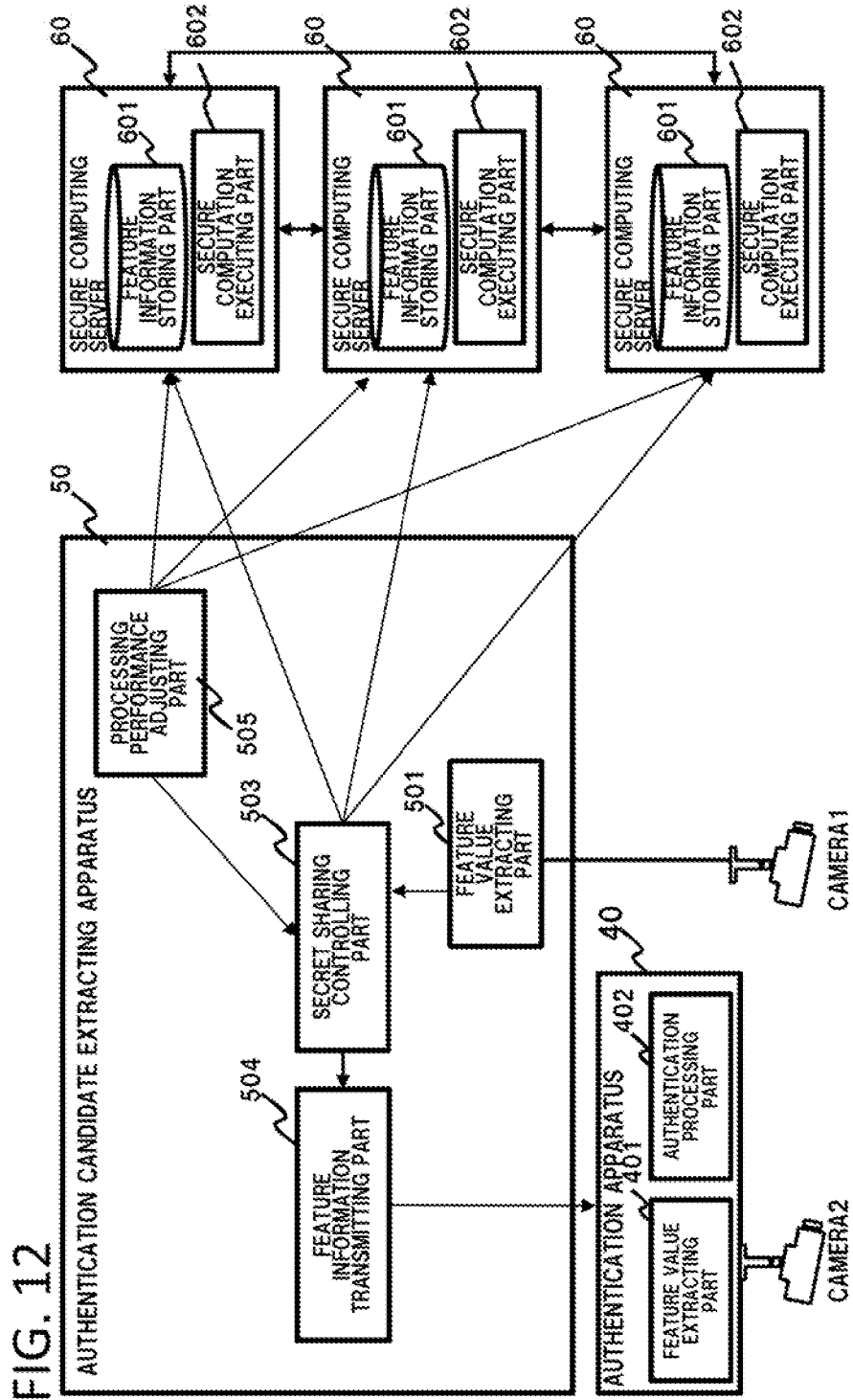
FIG. 12 is a diagram illustrating an example of a schematic configuration of an authentication system according to a second example embodiment.

FIG. 12 is a diagram of a configuration of the authentication system of the second example embodiment of the present invention. Referring to FIG. 12, the configuration of an authentication apparatus 40 connected to a camera 2, an authentication candidate extracting apparatus 50 connected to a camera 1, and three secure computing servers 60 is illustrated. The camera 1 connected to the authentication candidate extracting apparatus 50 is installed at a first point, and the camera 2 connected to the authentication apparatus 40 is installed at a second point (see FIG. 13).

The authentication candidate extracting apparatus 50 inputs biometric information obtained at the first point for a to be authenticated entity moving from the first point to the second point. The authentication candidate extracting apparatus 50 stores feature information for the authentication process of the to be authenticated entity. For example, if the to be authenticated entity is a passenger, the second point is a location where the biometric information of the passenger is acquired, such as a camera in front of a station ticket gate.

The authentication apparatus 40 performs authentication processing using the biometric information of the to be authenticated entity obtained at the second point to determine whether or not to allow the passenger to pass through the ticket gate, etc., and controls the gate of the station ticket gate. In other words, the target for the authentication process by the authentication apparatus 40 is a candidate extracted by the authentication candidate extracting apparatus 50. Thus, in the authentication system of the second example embodiment, the candidates are filtered out by the authentication candidate extracting apparatus 50, and the authentication apparatus 40 performs authentication using the filtered candidates. As the first point, a place (passage or stairs) where passengers are likely to pass before the ticket gate of the station is selected (see Camera 1 in FIG. 13). The above is only an example, and the to-be-authenticated entity and authentication apparatus are not limited to the above passenger and ticket gate.

Referring to FIG. 12, the authentication apparatus 40 has a feature value extracting part 401 that inputs the biometric information acquired at the second point, and an authentication processing part 402 that performs authentication processing using the candidate feature information received from the authentication candidate extracting apparatus 50 and the feature information extracted from the image shot by the camera 2 set at the second point. Then the authentication apparatus 40 performs biometric authentication to identify a person in an image shot by the camera 2 using the feature information sent from the authentication candidate extracting apparatus 50. The feature extracting part 401 may be installed at a side of the second point. In this case, the feature extracting part 401 functions as a biometric information input part.

The authentication apparatus 40 is assumed to discard the feature information sent from the authentication candidate extracting apparatus 50 at a predetermined timing. This timing may be when the authentication of a person conforming to the feature information sent from the authentication candidate extracting apparatus 50 is successful, or when a person conforming to the feature information sent from the authentication candidate extracting apparatus 50 has not been detected for a predetermined period of time. In this way, it is possible to prevent a situation in which personal information (feature information) is retained in the authentication apparatus 40 for a longer time than necessary.

In the following description, the feature information transmitted from the authentication candidate extracting apparatus 50 is feature information for face authentication, and the authentication apparatus 40 will be described as performing so-called face authentication. Of course, the scope of application of the present invention is not limited to face authentication, but can also be applied to authentication using other biometric information.

The authentication candidate extractor 50 comprises a feature value extracting part 501, a secret sharing controlling part 503, a feature information transmitting part 504, and a processing performance adjusting part 505.

The feature value extracting part 501 crops out a part of a person's face from the image captured by the camera 1, extracts its feature values, and composes feature information formed of the extracted feature values side by side, which is transmitted to the secret sharing controlling part 503. In the case where multiple faces of a person are in one image, the feature value extracting part 501 specifies an area of each person's face from one image and computes multiple feature information. The feature value extracting part 501 may be located on a side of the camera 1. In this case, the feature value extracting part 501 functions as a biometric information input part.

The secret sharing controlling part 503 generates share information by secret sharing from the feature information received from the feature value extracting part 501, and transmits the share Information to the secure computing servers 60. Furthermore, the secret sharing controlling unit 503 instructs the secure computing servers 60 to perform a computation using the share information. More concretely, the secret sharing controlling part 503 instructs the secure computing servers 60 to select a person who has features similar to the features of the person transmitted as share information from the persons data held by each of the secure computing servers 60, that is, a candidate of feature information for the authentication process.

When the secret sharing controlling part 503 receives the selection result (candidate feature information for authentication processing) from the secure computing servers 60, it instructs the feature information transmitting part 504 to transmit the feature information to the authentication apparatus 40. A number of different methods can be adopted regarding a number of candidates for authentication processing, such as a method of taking the maximum value within a range that does not affect the response performance of the authentication apparatus 40, or a method of selecting only those candidates whose similarity calculated by a predetermined computation method exceeds a specified value. Another method can be adopted in which the number of candidates for the authentication process is specified on a side of the secret sharing controlling part 503, and the secure computing server 60 extracts a specified number of candidates for the authentication process.

The secret sharing controlling part 503 may transmit the feature information extracted by the feature value extracting part 501 as the candidate feature information for the authentication process to be transmitted to the authentication apparatus 40. In this way, it is possible to improve accuracy of authentication using clothing and hairstyle of a person in the authentication apparatus 40.

The secret distribution controlling part 503 may also have a function to secure computing circuits (secure computing programs) to be executed by the secure computing servers 60 for distribution.

The feature information transmitting part 504 transmits to the authentication apparatus 40 the candidate feature information for the authentication process received from the secret sharing controlling part 503.

The processing performance adjusting part 505 adjusts the performance of the secure computing process in the secure computing servers 60 so that candidates satisfying the predetermined required accuracy can be extracted within a range that is in time for the authentication process in the authentication apparatus 40, based on the predicted time for the to-be-authenticated entity to arrive at the second point from the first point. Concretely, the processing performance adjusting part 505 predicts the time until the person shot by the camera 1 is shot by the camera 2, and notifies the secure computing servers 60 information regarding a significant number of digits of the share information to be used in the computing process of a candidate for authentication in time for that time. The time until the person shot by camera 1 is shot by camera 2 can be calculated based on distance between camera 1 and camera 2 and average movement speed of people. As the average movement speed of people, the average movement speed during each time period can be used. If there are multiple paths between the camera 1 and the camera 2, probability that these paths are used may be taken into account in predicting the time described above. Also, if there are escalators, moving sidewalks, or other means of transportation between the camera 1 and the camera 2, the probability that these will be used may be taken into account in calculating the time.

Figure 13:
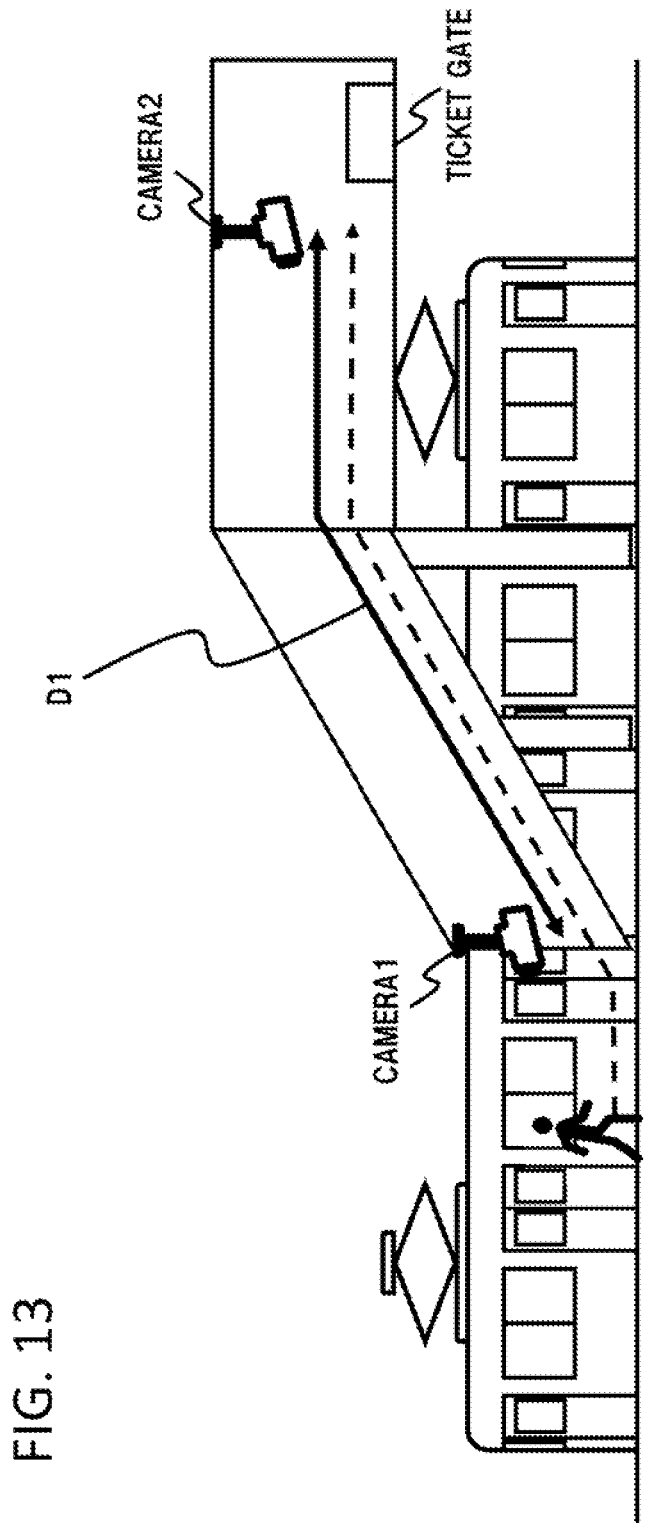
FIG. 13 is a diagram illustrating an example of installation of a camera according to the second example embodiment.

FIG. 13 is a diagram illustrating an example of camera layout in the second example embodiment of the present invention. In this case, the processing performance adjusting part 505 can compute the time until a person is photographed by the camera 2 after being photographed by the camera 1, according to distance D1 between the camera 1 and the camera 2 and average moving speed of a person.

As described above, a method of adjusting speed of secure computing process can be adopted by increasing or decreasing number of digits of information elements (feature values) that constitute feature information when extracting candidate feature information for authentication process on the secure computing server 60 side.

The processing performance adjusting part 505 computes the processing time allowed for the extraction of candidates for the authentication process at the secure computing server 60 based on distance between cameras and movement speed of the person. Thereafter, the processing performance adjusting part 505 judges whether or not the actual processing time of the secure computing server 60 exceeds the above allowable processing time when the significant digits of the feature information (share information) used by the secure computing server 60 for the matching process is the current value (e.g., initial value; without digit reduction). In order to achieve this judgment, the relationship between the number of significant digits of the share information handled by the secure computing server 60 and the processing time of the secure computing server 60 is observed in advance and stored in the authentication candidate extracting apparatus 50 in advance. The processing performance adjusting part 505 then makes the above judgment by referring to said pre-stored relationship (the relationship between the number of significant digits and the processing time).

When the processing performance adjusting part 505 determines that the processing time computed above would exceed with the current number of significant digits, it decides to reduce the number of significant digits of the share information to be processed by the secure computing server 60. Concretely, the processing performance adjusting part 505 determines the number of significant digits of the share information to be processed by the secure computing server 60 based on the relationship between the number of significant digits and the above processing time stored in advance. The processing performance adjusting part 505 notifies the secure computing servers 60 of information regarding determined number of significant digits. For example, the processing performance adjusting part 505 may notify the number of significant digits itself to the secure computing servers 60, or it may notify the increase or decrease value of the number of significant digits to the secure computing servers 60. For example, in the latter case, when the number of significant digits is reduced from X digits to Y digits, the X-Y digit reduction in the number of significant digits is notified to the secure computing servers 60.

The secure computing server 60 comprises a feature information storing part 601 and a secure computation executing part 602, respectively.

The feature information storing part 601 stores the feature information of a person who may be a target of matching in the authentication apparatus 40 in a state of secrecy by secret sharing (the feature information of the person is stored as second share information). FIG. 14 is a diagram illustrating an example of feature information (before secrecy processing) used in this system. In the following explanation, the feature information is assumed to be a predetermined sequence of feature values (e.g., distances between feature points) of a person's face such as <11, 23, 45, . . . >. In the following explanation, an example of identifying one of five people with user IDs xxxx0001 to xxxx0005 in FIG. 14 using face authentication technology is given.

In accordance with instructions from the secret sharing controlling part 503 and the processing performance adjusting part 505, the secret computation executing part 602 selects a person who has features similar to those of the person whose biometric information acquired at the point of camera 1 was transmitted as secretly shared (distributed) share information (first share information), that is, a candidate of feature information for the authentication process, and transmits it to the secret sharing controlling part 503. As described above, the secure computation executing part 602 selects a candidate for authentication processing by using two share information (the feature information generated from information of the camera 1 and the feature information stored in the feature information storing part 601).

Furthermore, the secret calculation executing part 602 performs a shift operation on the two share information used in the authentication candidate extraction process based on the information on the number of significant digits of the share information notified by the authentication candidate extracting apparatus 50.

In this example embodiment, the secret distribution controlling part 503 and the secure computing server 60 function as a candidate selecting part that sets a number of candidates of feature information for the authentication process so that the authentication process in the authentication apparatus 40 can be completed within a predetermined time.

In the example of FIG. 12, three secure computing servers 60 are illustrated, but number of secure computing servers 60 is a matter to be determined by the required processing speed and fault tolerance, and there is no limit to the number.

Figure 15:
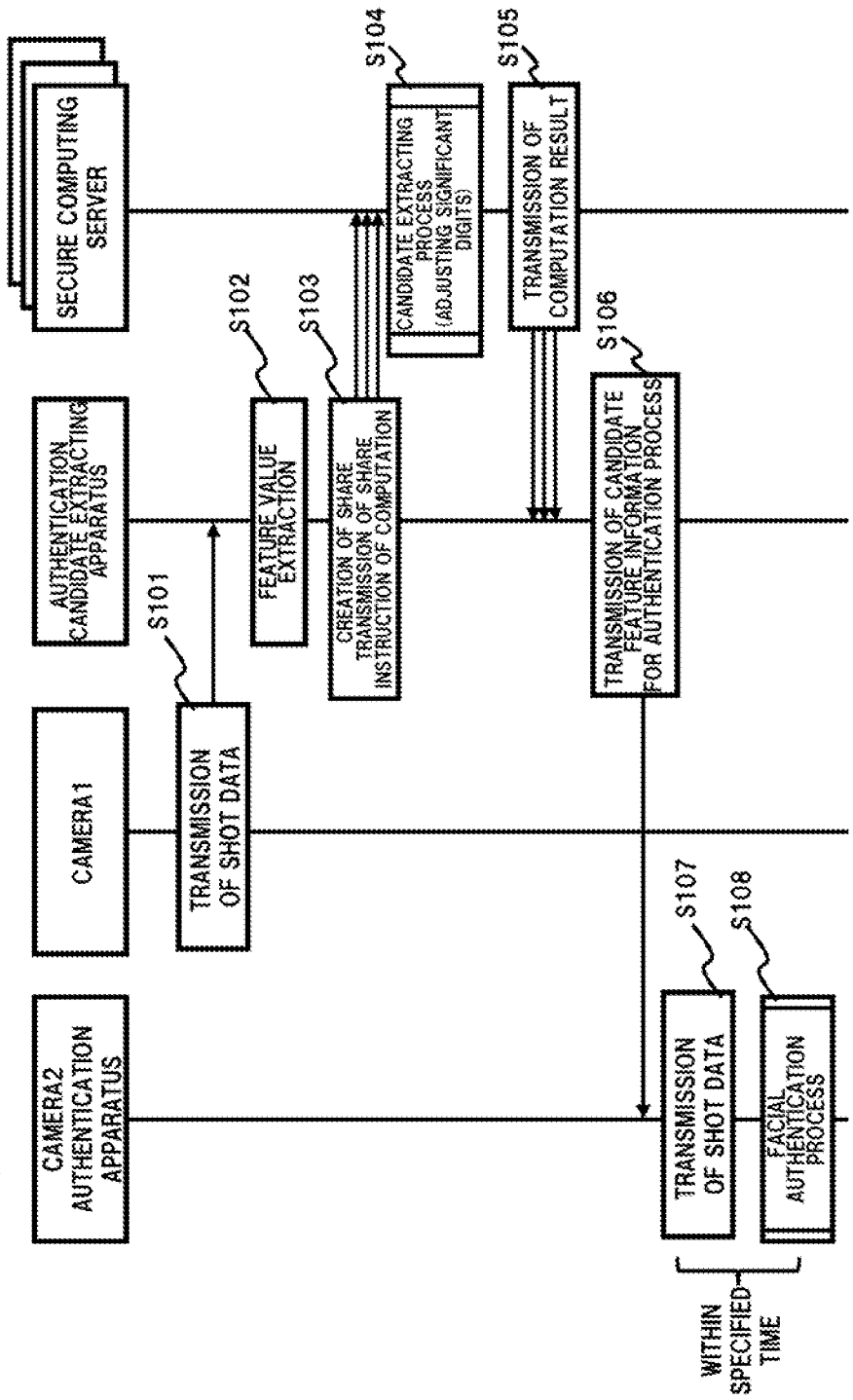
FIG. 15 is a sequence diagram illustrating an operation of the authentication system according to the second example embodiment.

Next, operation of this example embodiment will be described in detail with reference to the drawings. FIG. 15 is a sequence diagram illustrating the operation of the authentication system of the second example embodiment of the present invention. Referring to FIG. 15, first, camera 1 transmits shot data to authentication candidate extracting apparatus 50 (step S101). The camera 1 may transmit the shot data to the authentication candidate extracting apparatus 50 each time it recognizes a person, or it may repeatedly transmit the shot data at a predetermined time interval regardless of whether or not the person is recognized.

After receiving the shot data, the authentication candidate extracting apparatus 50 extracts feature values of facial images of the person in the shot data and creates feature information (Step S102).

Next, the authentication candidate extracting apparatus 50 creates share information to be transmitted to the secure computing server 60 from the extracted feature information, and transmits it to each secure computing server 60. In addition, the authentication candidate extracting apparatus 50 instructs the secure computing servers 60 to extract candidates having features similar to those of the person who has been transmitted (Step S103). When the authentication candidate extracting apparatus 50 determines that the number of significant digits needs to be adjusted at the secure computing server 60, it also notifies the secure computing server 60 with information regarding the number of significant digits.

After receiving the above instructions, the secure computing server 60 uses the share information received from the authentication candidate extracting apparatus 50 to select a candidate of a person with features similar to those of a person shot by the camera 1 (Step S104). The secure computing server 60 then transmits computation results (selection results) to the authentication candidate extracting apparatus 50 (Step S105). If the secure computing server(s) 60 is notified of information regarding the number of significant digits, it selects a candidate of a person having features similar to those of the person shot by the camera 1, for example, after performing a reduction of the specified number of digits (right shift operation of the specified number of digits) on the feature value.

After receiving the selection result, the authentication candidate extracting apparatus 50 restores candidate feature information for the authentication process using the information received from the secure computing servers 60, and transmits it to the authentication apparatus 40 (Step S106).

In the above described step S106, instead of the candidate feature information for the authentication process that is recovered using the information received from the secure computing server 60, the authentication candidate extracting apparatus 50 may transmit feature information created from an image of the camera 1. In this case, the feature information created from the image of camera 1 is identified based on the candidate feature information for the authentication process that is recovered using the information received from the secure computing servers 60. At this time, instead of performing the process of selecting candidates of persons with similar features in step S105, the process may be used to determine whether there is a person who is judged to be the same person as the person captured by the camera 1. In this way, the face authentication process in the authentication apparatus becomes a one-to-one authentication, which reduces the computational cost.

On the other hand, the camera 2 transmits the shot data to the authentication apparatus 40 (Step S107). Then, within a specified time, the authentication apparatus 40 performs face authentication of the person photographed by the camera 2 using the candidate feature information for the authentication process received from the authentication candidate extracting apparatus 50 (Step S108).

Figure 16:
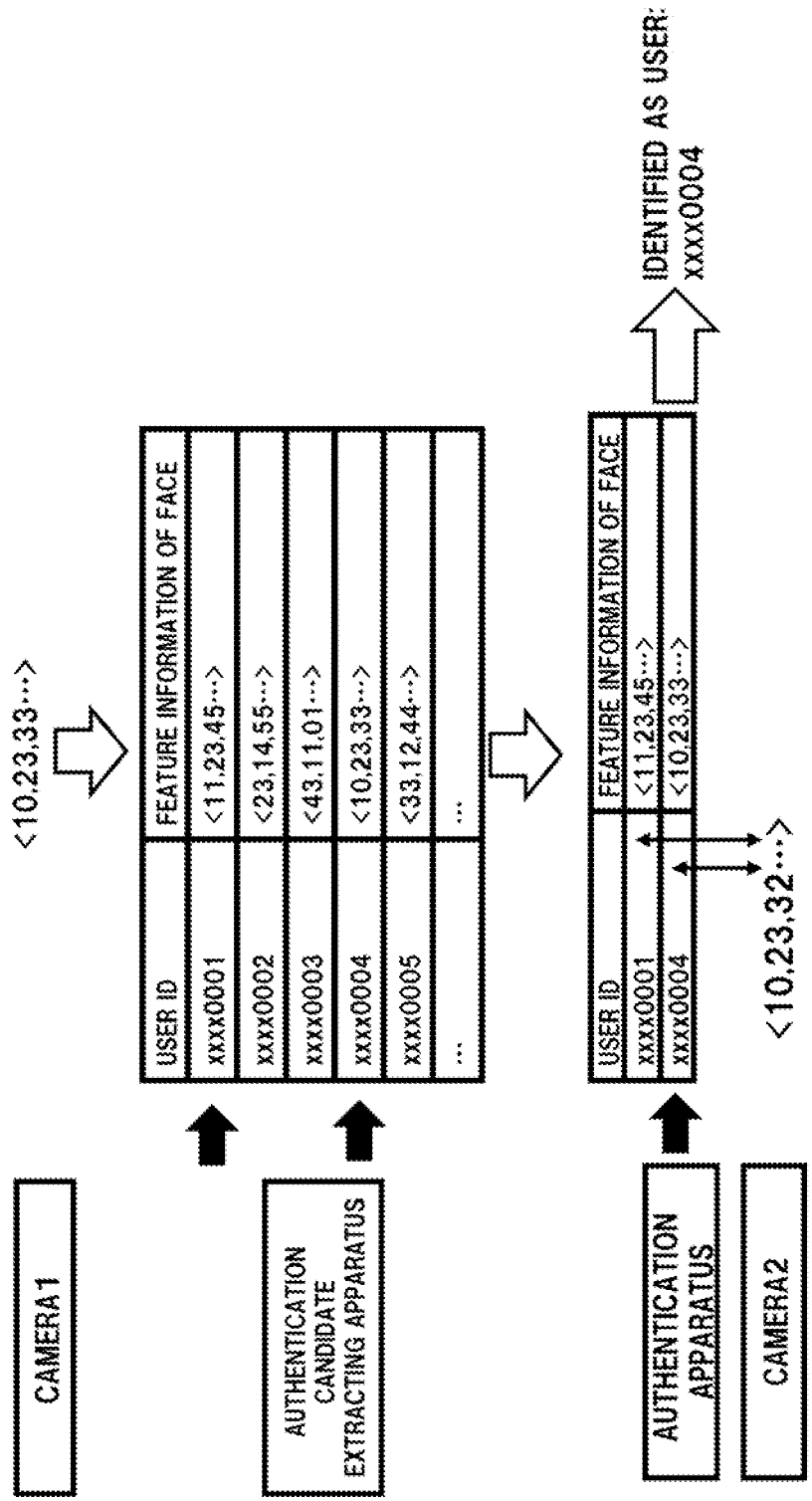
FIG. 16 is a diagram to explain the operation of the authentication system according to the second example embodiment.

The effects of the above authentication system will be described in detail with reference to the drawings. FIG. 16 is a diagram to explain operation of the authentication system of the second example embodiment of the present invention. For example, as shown in FIG. 16, an example of a person with feature information <10, 23, 33, . . . > being shot by cameras 1 and 2 will be described.

When the person is shot by the camera 1 installed at the first point, the authentication candidate extracting apparatus 50 extracts feature information <10, 23, 33, . . . > and instructs the secure computing server(s) 60 to select a candidate for the authentication process.

The secure computing server(s) 60 receiving the above instructions selects, for example, a person with user ID: xxxxx0001 having feature information <11, 23, 45, . . . > and a person with user ID: xxxxx0004 having feature information <10, 23, 33, . . . >, as illustrated in FIG. 16. Then, the authentication candidate extracting apparatus 50 transmits the feature information of user ID: xxxx0001 and user ID: xxxx0004 to the authentication apparatus 40. As a result, the number of persons to be matched by the authentication apparatus 40 will be reduced from five to two.

The authentication device 40 matches the feature information <10, 23, 33, . . . > extracted from the image shot by the camera 2 with the feature information of the user ID: xxxx0001 and user ID: xxxx0004, respectively, and selects the user with the higher degree of similarity. In the example of FIG. 16, the authentication apparatus 40 determines that the person shot by the camera 2 is the person with the user ID: xxxx0004. As described above, since the number of persons to be matched by the authentication apparatus 40 is at most two, it is possible for the authentication apparatus 40 to authenticate the person shot by the camera 2 within the required response time.

Variation 1 of the Second Example Embodiment

Figure 17:
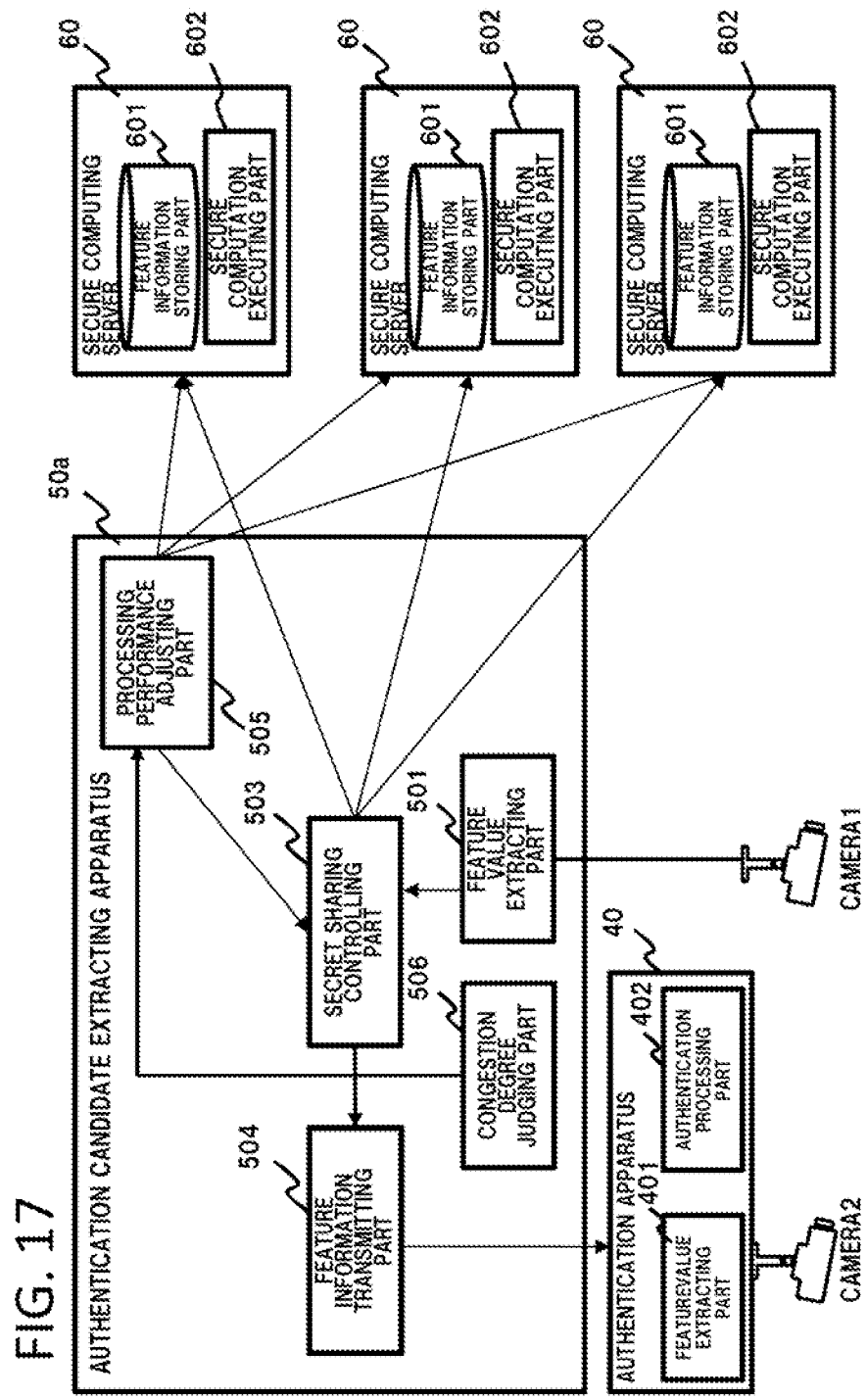
FIG. 17 is a diagram illustrating schematic configuration of an authentication system of variation 1 according to the second example embodiment.

Next, Variation 1 of the second example embodiment, in which the processing speed of the secure computing servers 60 is adjusted according to the degree of congestion between a camera 1 and a camera 2, will be described in detail with reference to the drawings. FIG. 17 is a diagram illustrating a configuration of the authentication system of Variation 1 of the second example embodiment of the present invention. A difference from the configuration illustrated in FIG. 12 is that a congestion degree judging part 506 is added to the authentication candidate extracting apparatus 50a. Since the rest of the configuration is the same as the configuration illustrated in FIG. 12, the difference will be mainly described below.

The congestion degree judging part 506 judges degree of congestion according to number of parts of human faces cut out from images shot by the camera 1 in the feature value extracting part 501, and transmits the result to the processing performance adjusting part 505. For example, when fewer faces than a specified threshold are shot in one image, the congestion degree judging part 506 judges that the congestion degree=small, and transmits congestion degree information (congestion degree=small) to the processing performance adjusting part 505 (see FIG. 18). In the example of FIG. 17, a configuration in which the congestion degree judging part 506 judges the congestion degree based on information obtained from the feature value extracting part 501 is adopted, but a configuration in which the congestion degree judging part 506 is connected to another camera and measures the congestion degree independently of the feature value extracting part 501 can also be adopted.

When the processing performance adjusting part 505 receives the congestion degree information (congestion degree=small), it predicts that the time until the person shot by the camera 1 is shot by the camera 2 will be shorter than usual. Then, the processing performance adjusting part 505 adjusts the speed of the secure computation process in the secure computing servers 60 in order to meet the time.

Figure 18:
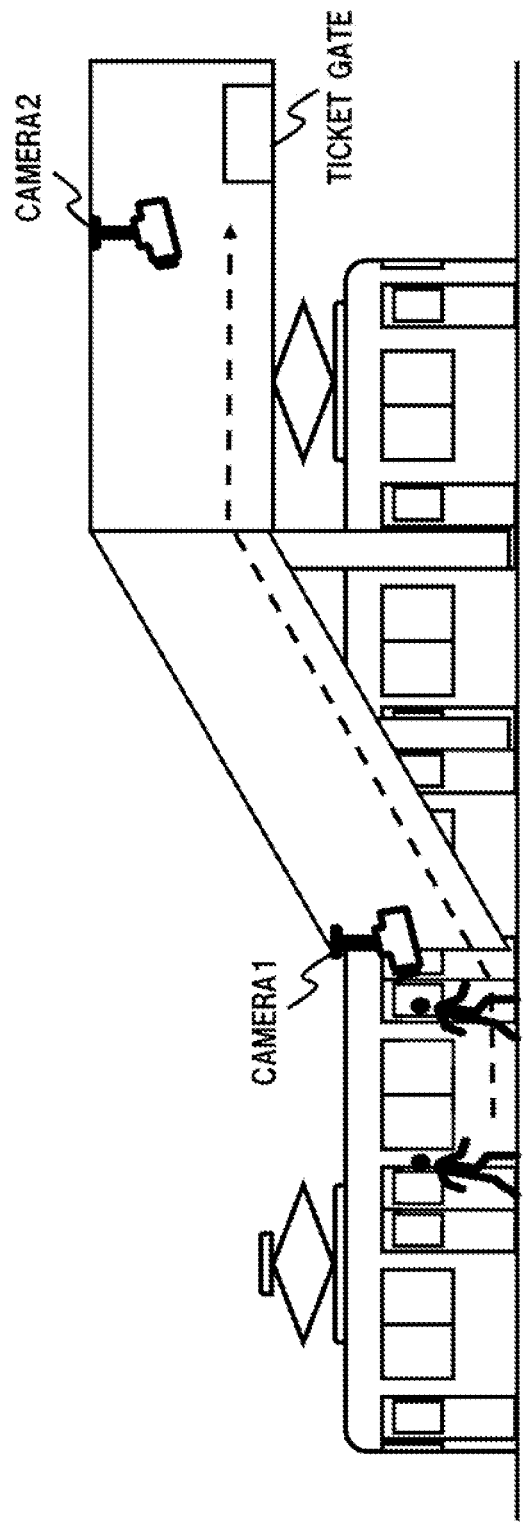
FIG. 18 is a diagram illustrating operation of the authentication system of variation 1 according to the second example embodiment.

For example, suppose that a small number of people are shot by the Camera 1 as shown in FIG. 18. In this case, since fewer passengers get off the train and head for (walk toward) the ticket gate, the time for the people in the camera 1 to move to the position of the camera 2 will be shorter than in case of congestion. In this case, time margin in the secure computing server 60 shrinks, so the processing performance adjusting part 505 instructs the secure computing server 60 to select a candidate using a computation method that is less accurate than usual but has a faster processing speed. More concretely, the processing performance adjusting part 505 instructs the secure computing server 60 to select candidates for authentication using a smaller number of significant digits than usual.

Figure 19:
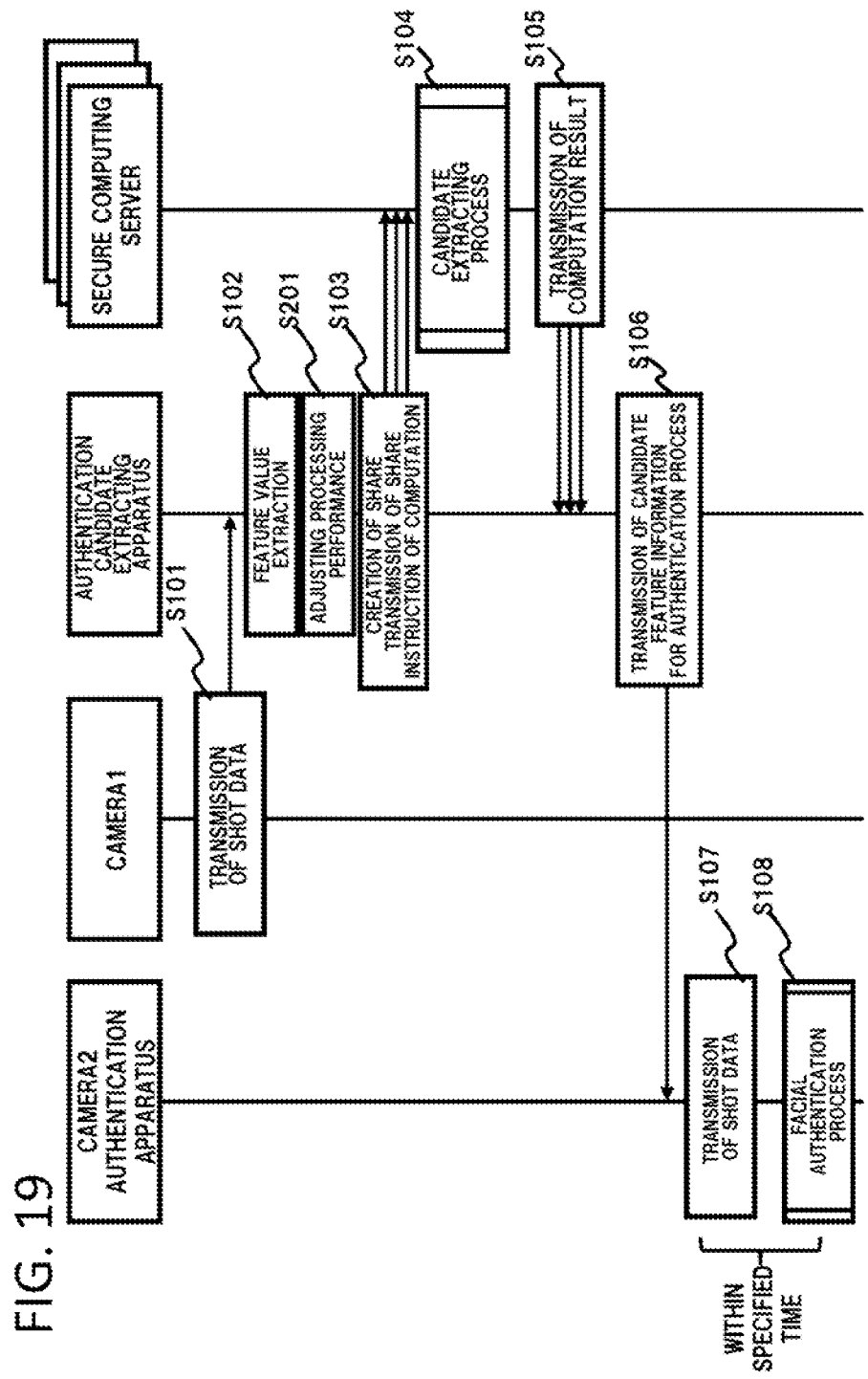
FIG. 19 is a sequence diagram illustrating operation of the authentication system of variation 1 according to the second example embodiment.

Next, operation of the Variation 1 will be described in detail with reference to the drawings. FIG. 19 is a sequence diagram illustrating the operation of the authentication system of Variation 1 of the second example embodiment of the present invention. The difference from the sequence diagram illustrated in FIG. 15 is that after the feature value extraction in step S102, a processing performance adjusting process (step S201) (according to degree of congestion) is added. The other processes are the same as those illustrated in the sequence diagram in FIG. 15, and explanation is omitted.

As described above, according to this Variation 1, it is possible to adjust processing speed of the secure computing servers 60 according to the degree of congestion between the cameras 1 and 2, and to optimize processing time in the authentication apparatus 40. In other words, this variation is particularly suitable for a ticket gate system in railroad. For example, during daytime on weekdays when number of passengers is small, the degree of congestion is low, but speed of movement of passengers increases according to the degree of congestion, so that rapid computation of authentication candidates is possible by taking that time into account.

In the above variation, it is described that the degree of congestion is judged by counting number of people's faces cropped from image shot by the camera 1. However, if the degree of congestion is known depending on day of week or time of day, the degree of congestion estimated using these day and time information may be used. In addition, the degree of congestion may be computed using both number of people' faces cropped from the images taken by the camera 1 and the day and time information.

Furthermore, the adjustment of the speed of the secure computation process according to the degree of congestion is only an example, and depending on structure of station, etc., travel time of each person may not change significantly even if the degree of congestion is low. In contrast, to some extent, the travel time required for each person may change significantly when congestion increases. More preferably, a method can be adopted to adjust performance appropriately according to actual travel time of each person obtained in the most recent authentication process and degree of congestion.

Variation 2 of the Second Example Embodiment

Figure 20:
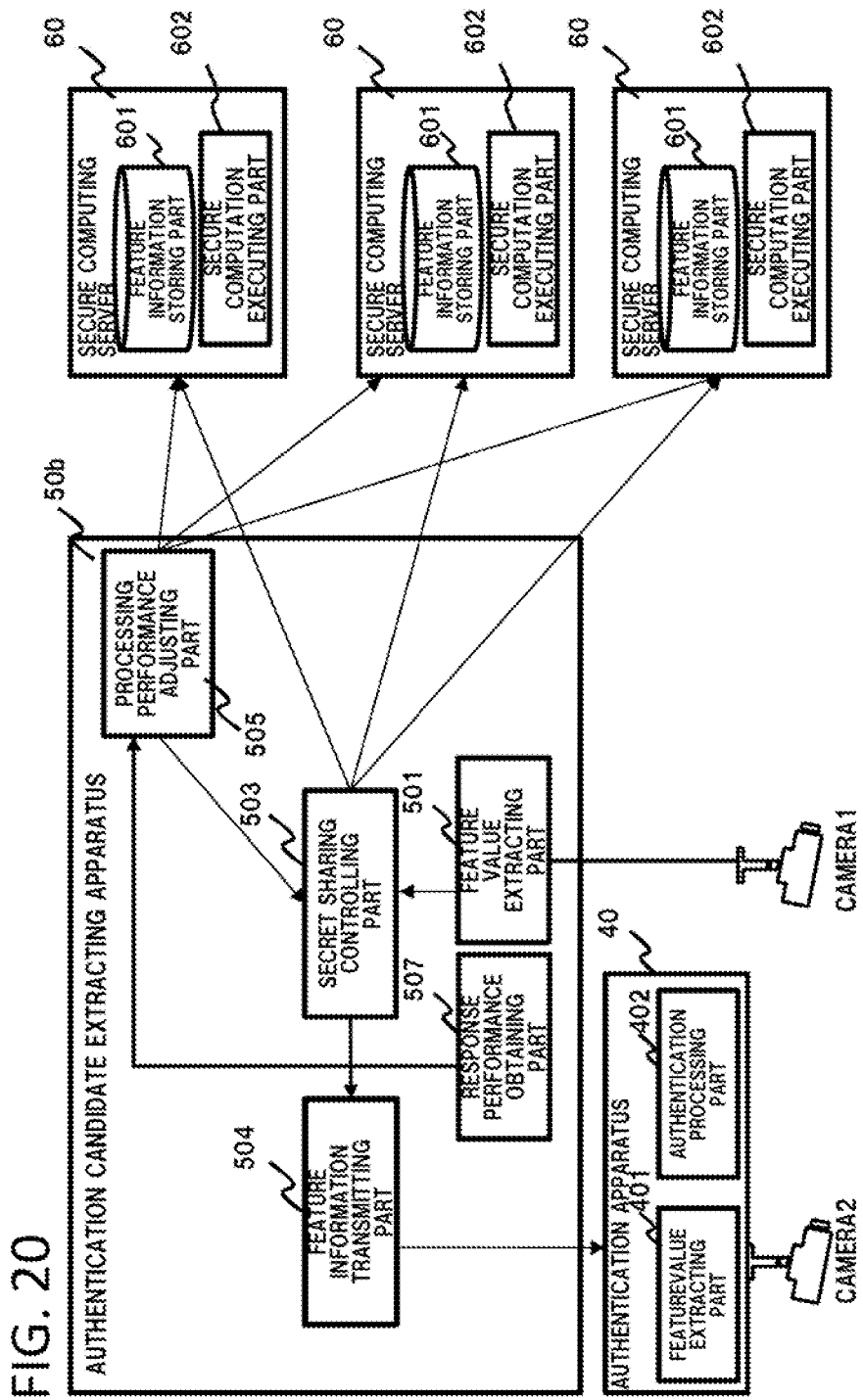
FIG. 20 is a diagram illustrating schematic configuration of an authentication system of variation 2 according to the second example embodiment.

Next, Variation 2 of the second example embodiment, in which processing performance of the secure computing servers 60 is adjusted according to response performance of the authentication process in the authentication apparatus 40, will be described in detail with reference to the drawings. FIG. 20 shows a configuration of authentication system of Variant 2 of the second example embodiment of the present invention. A difference from the configuration shown in FIG. 12 is that a response performance obtaining part 507 is added to the authentication candidate extracting apparatus 50b. Since the rest of the configuration is the same as the configuration illustrated in FIG. 12, the difference is mainly described below.

The response performance obtaining part 507 obtains from the authentication apparatus 40, as response performance, average response time from the time the feature information is sent to the authentication apparatus 40 until the response is obtained. The response performance obtaining part 507 then transmits the obtained response performance to the processing performance adjusting part 505.

When the average response time becomes longer than a specified target response time (threshold 1), the processing performance adjusting part 505 adjusts speed of the secure computation process in the secure computing server 60 so that response time in the authentication apparatus 40 becomes shorter. In addition, when the average response time becomes shorter than a predetermined target response time (threshold 2; provided that threshold 1≥threshold 2), the processing performance adjusting part 505 adjusts the processing performance in the secure computing servers 60 so that the response time in the authentication apparatus 40 becomes longer.

Figure 21:
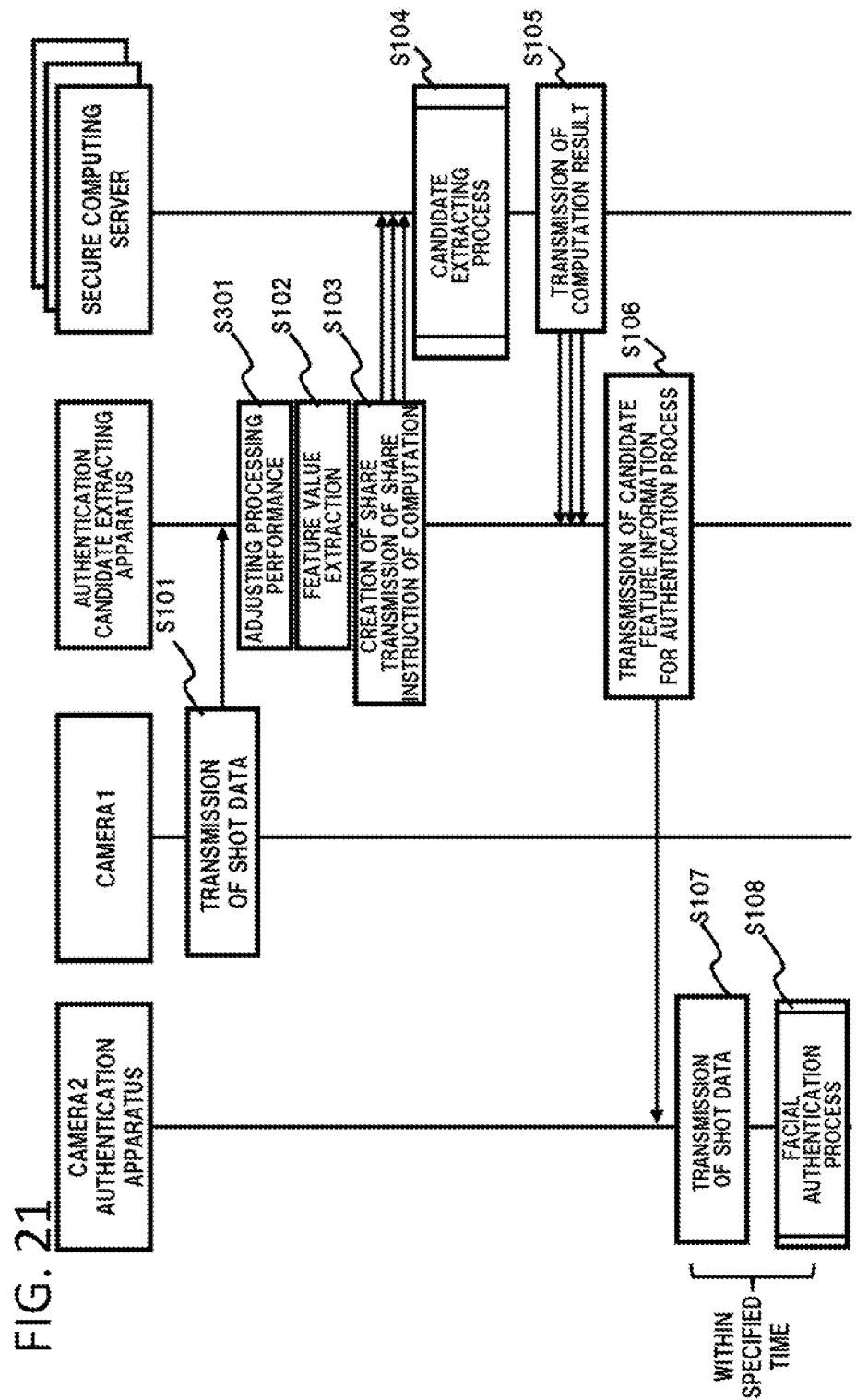
FIG. 21 is a sequence diagram illustrating operation of the authentication system of variation 2 according to the second example embodiment.

Next, operation of this variation is described in detail with reference to the drawings. FIG. 21 is a sequence diagram illustrating operation of the authentication system of variation 2 of the second example embodiment of the present invention. A difference from the sequence diagram illustrated in FIG. 15 is that a processing performance adjustment process (step S301) (due to the response performance of the authentication device 40) is added before the feature value extraction in step S102. The other processes are the same as those illustrated in the sequence diagram in FIG. 15, and description is omitted.

Figure 22:
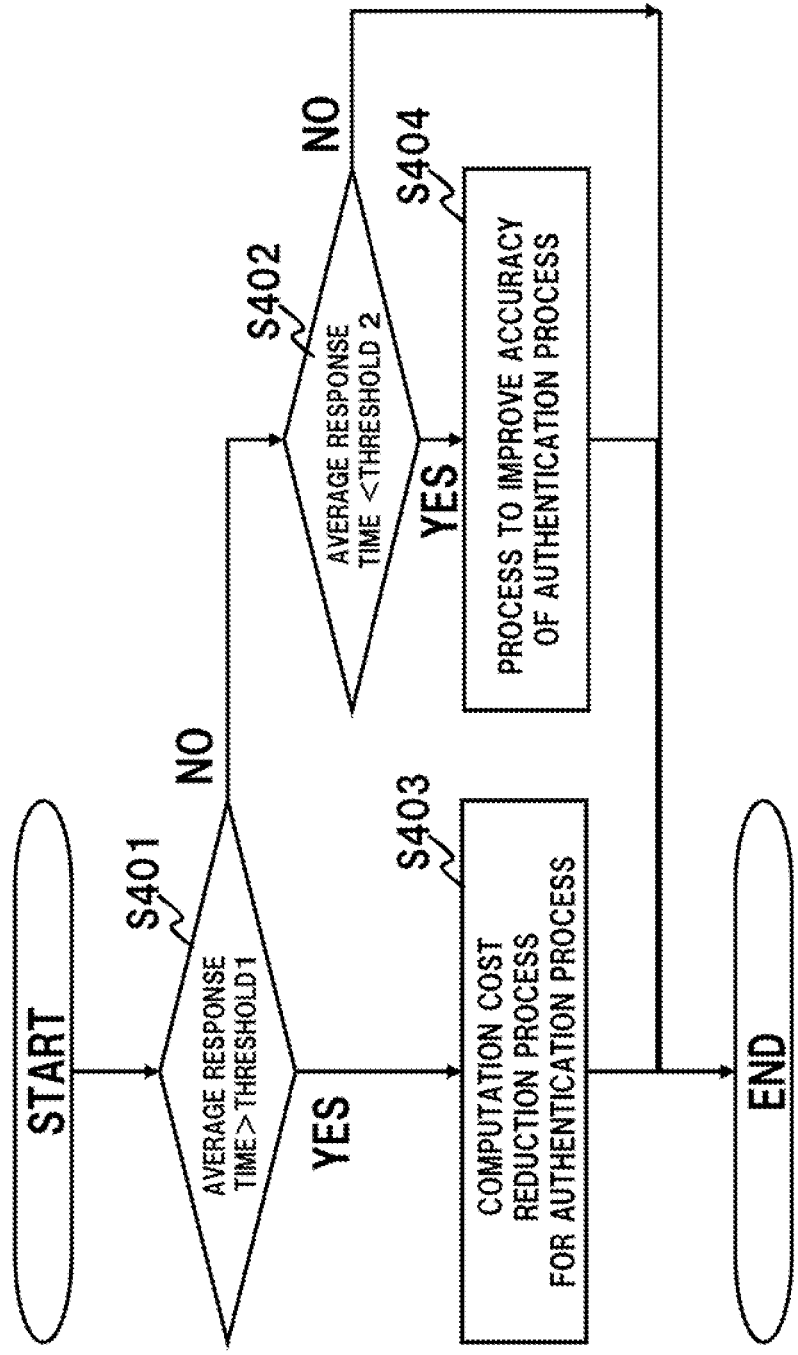
FIG. 22 is a flowchart illustrating a performance adjusting process by authentication candidate extracting apparatus of variation 2 according to the second example embodiment.

FIG. 22 is a flowchart illustrating the processing performance adjusting process by the authentication candidate extracting apparatus 50b. Referring to FIG. 22, the authentication candidate extracting apparatus 50b, for example, when average response time is longer than specified target response time (threshold 1) (YES in step S401), instructs the secure computing servers 60 to change candidate selection processing so that computation cost of authentication processing in the authentication apparatus 40 is reduced. For example, the processing performance adjusting part 505 instructs the secure computing servers 60 to increase number of digits of feature value in the candidate selection process (e.g., to return to initial value), thereby achieving extraction of candidates with higher accuracy. This reduces number of persons to be matched by the authentication apparatus 40, thus shortening response time at the authentication apparatus 40. This makes it possible to prevent processing delays in the authentication apparatus 40 in advance.

On the other hand, if the average response time is shorter than the predetermined target response time (threshold 2) (YES in step S402), the processing performance adjusting part 505 determines that the authentication apparatus 40 has a margin of processing capacity. In this case, the processing performance adjusting part 505 equalizes processing capacity of the authentication apparatus 40 and the secure computing servers 60 by reducing number of significant digits of the feature value used for the candidate selection process in the secure computing server 60. This makes it possible to optimize a period in which feature information is stored in the authentication apparatus 40. On the other hand, the above process increases the number of persons to be matched by the authentication apparatus 40 and increases the response time of the authentication apparatus 40, however, this is not a problem as long as the time required for a person is within a range to move from the first point to the second point.

As described above, in this variation, the authentication candidate extracting apparatus 50b increases or decreases the number of digits of the feature values included in the feature information used by the secure computing server 60 to extract candidates for the authentication process according to the average response time of the authentication process of the authentication apparatus 40. As a result, the speed of the secret computation process in the secure computing servers 60 is optimized.

Note that in variation 2, it is described that the average response time is used as an indicator of the response performance of the authentication process in the authentication apparatus 40, but instead of the average response time, it is possible to use maximum response time, median or maximum frequency of response time, etc.

As above, the second example embodiment and variations are described, but other variations are of course possible.

For example, in the above example embodiment, facial feature data is used as the identification information of the authenticated entity, but it can also be applied to authentication using biometric information other than facial feature data. For example, the above described camera 1 can be installed at an entrance of a company to filter out candidates for authentication, and then transmit the candidates for authentication processing to the authentication apparatus 40 that performs iris authentication, etc., using a camera 2 installed in a security area of the company.

In addition, the performance of the extraction process of candidates for authentication process was explained as being adjusted by adjusting the speed of the secure computation process in the secure computing servers 60, but the method of adjusting performance of extraction process of candidates for authentication process is not limited to this. For example, the secure computation method itself can be changed, or the processing method (algorithm and parameters) using secret sharing method in the secure computing servers 60 can also be changed. It is also suitable to prepare multiple groups of secure computing servers 60 and divide the process of extracting candidates for the authentication process among each of them, so that each of them can perform the extraction process of candidates with higher accuracy.

It is also possible to use a secure computation method as the authentication process in the authentication apparatus 40.

The description has been made with examples of adjusting the processing performance of the secure computing servers 60 based on degree of congestion at the camera 1 and response performance of the authentication apparatus 40, but other parameters may also be used to adjust the processing performance of the secure computing servers 60. For example, quality of images shot by the camera 1 may vary depending on orientation of face, facial expression, facial color, brightness (depending on shooting time of day), etc. These may vary depending on shooting time, orientation of face, distance from the camera, etc. Depending on the quality of the images shot by the camera 1, the number of digits of the feature values included in the feature information used to select candidates for the authentication process may be increased or decreased. For example, if the image of the to-be-authenticated entity in the image shot by the camera 1 is coarse, the accuracy of the selection of candidates for the secure computing servers 60 will also be reduced. In this case, the processing performance adjusting part 505 may reduce the number of digits of the feature values in the candidate selection process to an extent that the selection accuracy of the candidates of the secret calculation servers 60 does not change. This makes it possible to allocate computation resources of the secure computing servers 60 to the extraction of candidates for other to be authenticated bodies.

In addition, although it has been described that the authentication candidate extracting apparatus 50 selects candidates for the authentication process using face images shot by the camera 1, information other than face images shot by the camera 1 may be used to filter out candidates for the authentication process. For example, if the passenger's commuter pass or ticket information can be used to filter out a station at which to get off train, this information may be used to filter out candidates for the authentication process.

Furthermore, although it has been explained that the second point is near the ticket gate and the first point is the passage or stairs at a preceding position thereof, the combination of the first and second points is not limited to the above example. For example, the system can be applied to entry/exit control at buildings and event venues, as well as at ports and airports etc. In addition, although it has been described assuming that passenger exits from the ticket gate and the second point is near the ticket gate, it can also be applied to the case where the passenger enters from the ticket gate. In this case, the second point is selected as the area near the entrance ticket gate and the first point as the passage or stairs at a preceding position thereof.

[Hardware Configuration]

Next, a hardware configuration of each apparatus included in the system will be described.

Figure 23:
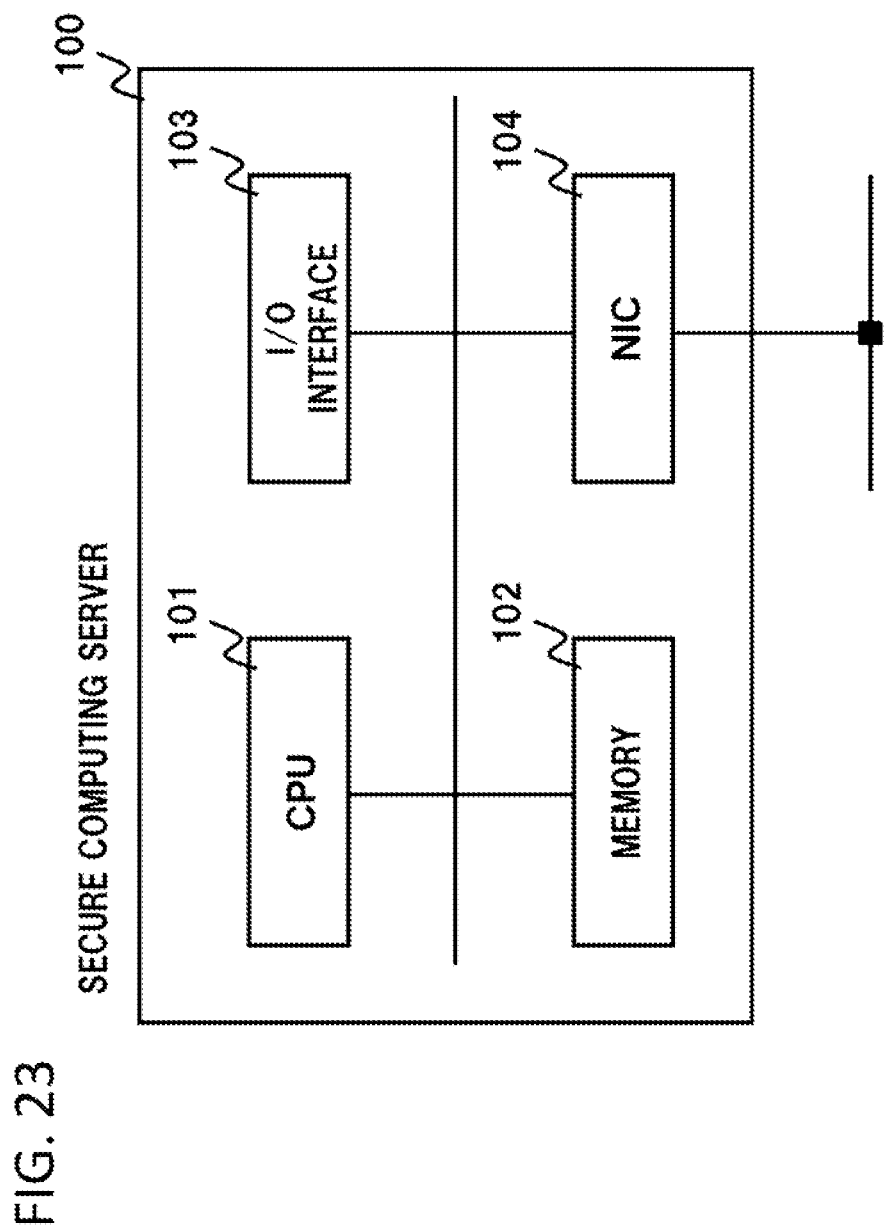
FIG. 23 is a diagram illustrating an example of hardware configuration of a secure computing server.

FIG. 23 is a diagram illustrating an example of a hardware configuration of the secure computing server 100. The secure computing server 100 is implemented by a so called information processing apparatus (computer), and has a configuration illustrated in FIG. 23. For example, the secure computing server 100 comprises a central processing unit (CPU) 101, a memory 102, an input/output interface 103, and a network interface card (NIC) 104 as a means of communication, all of which are interconnected by an internal bus.

Note that the configuration shown in FIG. 23 is not intended to limit the hardware configuration of the secure computing server 100. The secure computing server 100 may include hardware that is not illustrated in the figure. The number of CPUs, etc. included in the secure computing server 100 is also not intended to be limited to the example illustrated in FIG. 23. For example, a plurality of CPUs 101 may be included in the secure computing server 100.

Memory 102 is a RAM (Random Access Memory), a ROM (Read Only Memory), an auxiliary storage device (hard disk, etc.), or the like.

The input/output interface 103 is an interface with the input/output device not shown. The input/output device comprises, for example, display device, operation device etc. The display device is, for example, a liquid crystal display or the like. The operation device is a keyboard, a mouse etc., for example.

The function of the secure computing server 100 is implemented by the above described processing module. This processing module is realized, for example, by CPU 101 executing a program stored in the memory 102. In addition, the above program can be downloaded via a network, or updated using a storage medium that stores the program. Furthermore, the above processing module may be realized by a semiconductor chip. In other words, the functions performed by the above processing module can be realized by executing software on some kind of hardware.

Note that the secure computing server (30, 60), the controlling apparatus 10, etc. described in each embodiment can also be realized by an information processing apparatus (computer), and its hardware configuration is evident to those skilled in the art, so a detailed description is omitted.

[Variations]

Note that the configuration and operation of the secure computing server and system described in the above example embodiments are an example(s) and not intended to limit the configuration and operation of the secure computing server, etc. For example, in the first example embodiment, the controlling apparatus 10 notifies the secure computing server 30 of the information regarding the number of significant digits, but the information may be notified to the secure computing server 30 via the first and second apparatuses 21 and 22. In this case, each of the first and second apparatuses 21 and 22 may also notify the information regarding the number of significant digits when transmitting the share information to the secure computing server 30.

Alternatively, the controlling apparatus 10 may notify the secure computing server 30 of time that can be spent on "people flow analysis" and time at which such people flow analysis is to be completed, and the secure computing server 30 may autonomously adjust (reduce) the number of significant digits based on this information.

Each disclosure of the above cited PTL etc. is incorporated herein by reference thereto. Variations and adjustments of the example embodiment and examples are possible within the scope of the disclosure (including the claims) of the present invention and based on the basic technical concept of the present invention. Various combinations and selections (including partial deletion) of various disclosed elements (including the elements in the claims, example embodiment, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not explicitly disclose arbitrary numerical values or small ranges included in the ranges, these values and ranges should be deemed to have been concretely disclosed.

REFERENCE SIGNS LIST 10 controlling apparatus (controller)
11 requesting part
12 deciding part
13 instructing part
21 first apparatus
22 second apparatus
30,60,100 secure computing server
31 secure computation executing part
40 authentication apparatus
50,50a,50b authentication candidate extracting apparatus
101 CPU (Central Processing Unit)
102 memory
103 input/output interface
104 NIC (Network Interface Card)
211 camera
212 timer
213,401,501 feature value extracting part
214 feature value storing part
215 secret sharing part
402 authentication processing part
503 secret sharing controlling part
504 feature information transmitting part
505 processing performance adjusting part
506 congestion degree judging part
507 response performance obtaining part
601 feature information storing part
602 secure computation executing part

What is claimed is:

1. A system comprising:
a secure computing server that executes a shift operation to a share which is secretly shared; and
a controlling apparatus, comprising:
at least a processor; and
a memory in circuit communication with the processor,
wherein the processor is configured to execute program instructions stored in the memory to:
request each of a first apparatus that keeps identification information of a first moving entity obtained at a first point and a second apparatus that keeps identification information of a second moving entity obtained at a second point to provide the identification information of the first moving entity and the second moving entity to the secure computing server;
decide a number of significant digits of the identification information of the first moving entity and the second moving entity; and
send information regarding the number of significant digits of the identification information of the first moving entity and the second moving entity to the secure computing server, wherein
the secure computing server executes the shift operation to the identification information of the first moving entity and the second moving entity based on the information regarding the significant digits.

2. The system according to claim 1, wherein
the processor decides the number of significant digits of the identification information of the first moving entity and the second moving entity such that processing by the secure computing server using the identification information of the first moving entity and the second moving entity finishes within a predetermined time period.

3. The system according to claim 1, wherein
the server executes the shift operation in case where a number of significant digits in secret information corresponding to the share which is secretly shared is reduced.

4. The system according to claim 1, wherein
the shift operation is a right-shift operation.

5. The system according to claim 1, wherein
the share which is secretly shared is in modulo a power of 2 or a prime.

6. A system comprising:
a secure computing server that executes shift operation to a share which is secretly shared; and
an authentication candidate extracting apparatus including:
at least a processor; and
a memory in circuit communication with the processor,
wherein the processor is configured to execute program instructions stored in the memory to:
input biometric information obtained at a first point about an authenticated entity moving from the first point to a second point; and
make the biometric information shared secretly into first shared information and transmits the first shared information to the secure computing server,
wherein the secure computing server further comprises:
a feature information storing device that stores secretly shared feature information that is used for a process of authenticating the authenticated entity as second shared information; and
a secure computation executing processor that selects a candidate used for the processing of authentication using the first shared information and the second shared information;
wherein the processor is further configured to execute the program instructions to:
notify information regarding a number of significant digits of the first shared information and the second shared information so as to allow selection of the candidate that satisfies a predetermined required accuracy within a range that is in time for the authentication processing at an authentication apparatus that executes the authentication processing using the biometric information of the candidate obtained at the second point, based on a predicted time at which the authenticated entity reaches the second point from the first point; and
transmit feature information of the selected candidate by the secure computing server to the authentication apparatus; and
wherein the secure computation executing processor executes the shift operation based on the information regarding the number of significant digits of the first shared information and the second shared information.

7. The system according to claim 6, wherein
the processor calculates the predicted time based on a congestion degree between the first point and the second point.

8. The system according to claim 6, wherein
the processors increases or decreases a number of digits of feature value included in the feature information used in selection of the candidate for processing of identification according to a response time of the processing of identification of the authentication apparatus.

9. The system according to claim 6, wherein
the server executes the shift operation in case where a number of significant digits in secret information corresponding to the share which is secretly shared is reduced.

10. The system according to claim 6, wherein
the shift operation is Ua right-shift operation.

11. The system according to claim 6, wherein
the share which is secretly shared is in modulo a power of 2 or a prime.

* * * * *